(12) United States Patent
Tamaki et al.

(10) Patent No.: US 7,484,527 B2
(45) Date of Patent: Feb. 3, 2009

(54) SWITCH VALVE DEVICE

(75) Inventors: Shigeo Tamaki, Asahi (JP); Kosuke Umeda, Asahi (JP)

(73) Assignee: Kuroda Pneumatics Limited, Kanagawa (JP)

( * ) Notice: Subject to any disclaimer, the term of this patent is extended or adjusted under 35 U.S.C. 154(b) by 260 days.

(21) Appl. No.: 11/327,598

(22) Filed: Jan. 6, 2006

(65) Prior Publication Data
US 2007/0012369 A1   Jan. 18, 2007

Related U.S. Application Data

(63) Continuation of application No. PCT/JP03/08911, filed on Jul. 14, 2003.

(51) Int. Cl.
*F15B 13/04* (2006.01)
(52) U.S. Cl. ............ 137/596.1; 137/596.2; 137/596.15; 137/884
(58) Field of Classification Search ............. 137/596.1, 137/596.2, 596.15, 884
See application file for complete search history.

(56) References Cited

U.S. PATENT DOCUMENTS

| 4,861,232 | A * | 8/1989 | Ise et al. ..................... 137/884 |
| 6,202,672 | B1 * | 3/2001 | Ellis et al. ................ 137/596.2 |
| 6,427,721 | B1 * | 8/2002 | Zenker et al. ............ 137/596.2 |

FOREIGN PATENT DOCUMENTS

| JP | 02-248778 | 10/1990 |
| JP | 06-218679 | 8/1994 |
| JP | 11-114862 | 4/1999 |
| JP | 2000-165094 | 6/2000 |
| JP | 2000-227169 | 8/2000 |
| JP | 2001-030189 | 2/2001 |
| JP | 2002-079483 | 3/2002 |
| JP | 2002-307356 | 10/2002 |
| WO | WO 2005005109 A1 * | 1/2005 |

* cited by examiner

*Primary Examiner*—John Rivell
*Assistant Examiner*—Craig Price
(74) *Attorney, Agent, or Firm*—Winstead PC

(57) ABSTRACT

The present invention relates to a switching valve device used for vacuum suction of a member such as a semiconductor chip, and the object thereof is to break a vacuum rapidly and smoothly. The switching valve device includes a vacuum suction switching valve function for vacuum suction, a vacuum break switching valve function for vacuum break, and an open-to-atmosphere switching valve function which in conjunction with an operation of the vacuum suction switching valve function, opens a passage to the atmosphere side when the vacuum suction switching valve function is off and closes the passage to the atmosphere side when the vacuum suction switching valve function is on. The vacuum suction switching valve function, the vacuum break switching valve function, and the open-to-atmosphere switching valve function are integrally incorporated into a body portion.

5 Claims, 24 Drawing Sheets

SWITCH VALVE DEVICE

CROSS REFERENCE TO RELATED APPLICATION

This application is a continuation application of International Application No. PCT/JP03/08911, filed Jul. 14, 2003, and designating the U.S.

BACKGROUND OF THE INVENTION

1. Field of the Invention

The present invention relates to a switching valve device used for vacuum suction of a member such as a semiconductor chip.

2. Description of the Related Art

Conventionally, in a semiconductor manufacturing field, devices such as a mounter and a handler are used a lot for assembly, transfer, and so on of a member such as a semiconductor chip.

The devices such as the mounter and the handler transfers a product such as the semiconductor chip accurately to a predetermined position of a predetermined processing machine or measuring machine. Vacuum suction is used frequently for holding the product.

FIG. 31 shows a switching valve device used for such vacuum suction, and this switching valve device includes a vacuum suction switching valve 1 and a vacuum break switching valve 3.

The vacuum suction switching valve 1 is composed of a 2-port/2-position electromagnetic switching valve and a vacuum port V is connected to a vacuum source not shown.

The vacuum break switching valve 3 is composed of a 2-port/2-position electromagnetic switching valve and a pressurization port P is connected to a pressurization source not shown.

In such a switching valve device, for example, by turning on a solenoid 5 (hereinafter referred to as a vacuum solenoid) of the vacuum suction switching valve 1 in the handler, the product is attached by suction to a vacuum suction unit not shown connected to an output port A.

When the product is then transferred to a predetermined position for detachment, the vacuum solenoid 5 is turned off, and a solenoid 7 (hereinafter referred to as a vacuum break solenoid) of the vacuum break switching valve 3 is turned on.

Consequently, pressure air is supplied from the pressurization port P of the vacuum break switching valve 3, and the product is detached without fail from the vacuum suction unit connected to the output port A.

However, in such a switching valve device, there is a problem that at the turning-on of the vacuum break solenoid 7, sudden supply of the pressure air from the pressurization port P of the vacuum break switching valve 3 through the output port A to the vacuum suction unit causes overshoot due to a sudden increase in the internal pressure of a product attaching portion, which makes it difficult to smoothly detach the product attached by suction to the vacuum suction unit.

Namely, the sudden detachment of the product attached by suction to the vacuum suction unit from the product attaching portion may cause a problem that the product is mounted to a position which is displaced from the predetermined position, resulting in a trouble to perform the following work step. This positional displacement exerts an influence even on surrounding products, which may cause further positional displacement of other products.

There is another problem that vacuum suction force, that is, vacuum pressure, varies and its arrival time to the atmospheric pressure and the amount of overshoot change so that it is very difficult to always smoothly detach the product attached by suction to the vacuum suction unit at a set break air flow rate.

FIG. 32 shows a pressure change characteristic in the general usage of the switching valve device shown in FIG. 31. An electrical signal to the vacuum break solenoid 7 is turned on a time t1 after the turning-off of an electrical signal to the vacuum solenoid 5. The electrical signal supplied to the vacuum break solenoid 7 is turned off a time t2 later.

The pressure change during this period is as follows.

The vacuum solenoid 5 is turned off a response delay time T1 after the electrical signal to the vacuum solenoid 5 is turned off, and the supply of vacuum pressure ceases. As a result, held vacuum pressure starts to decrease gradually.

Further, when the time t1 elapses after the electrical signal to the vacuum solenoid 5 is turned off, the electrical signal to the vacuum break solenoid 7 is turned on. When a response delay time T2 elapses after it is turned on, the vacuum break solenoid 7 is turned on, supplying positive pressure as vacuum break pressure. As a result, the pressure in the output port A abruptly increases.

The electrical signal to the vacuum break solenoid 7 is in an on state for the time t2 until the pressure in the output port A approaches the pressure of the atmosphere, and thereafter it is turned off. The vacuum break solenoid 7 is brought into an off state a response delay time T3 after the electrical signal to the vacuum break solenoid 7 is turned off, so that the supply of vacuum break pressure ceases and the pressure in the output port A converges to the atmospheric pressure.

However, such a conventional switching valve device has the following problems.

For example, if the vacuum pressure is set to V, the pressure at a point in time when the vacuum break pressure starts to flow in changes between $V_L'$ and $V_H'$ because the set vacuum pressure drops to $V_L$ or conversely rises to $V_H$ depending on the amount of the vacuum pressure used.

With a fixed on-period of the vacuum break solenoid 7, when vacuum break starts at the pressure $V_L'$ which is close to the atmospheric pressure, the pressure will overshoot beyond the atmospheric pressure, and throw a workpiece attached by suction and even surrounding workpieces.

Conversely, when vacuum break starts at the pressure $V_H'$, the process of vacuum break is completed before the pressure reaches the atmospheric pressure, and proceeds to the next process without releasing the workpiece.

As a measure against the workpiece being thrown, it is possible to suppress an increase in the pressure in the output port A by shortening the time t2 to cut off the supply of vacuum break pressure earlier. However, in this case, the occurrence of the incident in which the workpiece is not released increases.

Conversely, as a measure against the workpiece being not released, it is possible to reduce the occurrence of the incident in which the workpiece is not released by prolonging the time t2 to cut off the supply of vacuum break pressure later. However, in this case, the occurrence of the incident in which the workpiece is thrown increases.

To solve such problems, there is a conventionally known switching valve device, as shown in FIG. 33, provided with a flow rate adjusting throttle valve 9 on the outlet side of the vacuum break switching valve 3. The pressure change in the general usage of this switching valve device is about the same as that of the switching valve device shown in FIG. 31.

However, this switching valve device adjusts the flow rate adjusting throttle valve 9 provided on the outlet side of the vacuum break switching valve 3 during the pressure change, so that the pressure increases more gently compared to when the throttle valve 9 is not used as shown in FIG. 34, which reduces such an overshoot that the workpiece is thrown at a point in time when the pressure converges to the atmospheric pressure.

The same effect can be obtained even if the vacuum pressure changes to $V_L$ or $V_H$ from a set vacuum pressure V.

However, in this switching valve device, the pressure increases gently but slowly. This affects the tact time very much in the case of devices such as a mounter for mounting many semiconductor chips on a substrate, which causes a large negative factor affecting device performance.

SUMMARY OF THE INVENTION

In view of solving such conventional problems, the object of the present invention is to provide a switching valve device which can break a vacuum rapidly and smoothly.

A switching valve device according to the present invention includes a vacuum suction switching valve function for vacuum suction; a vacuum break switching valve function for vacuum break; and an open-to-atmosphere switching valve function which, in conjunction with an operation of the vacuum suction switching valve function, opens a passage to an atmosphere side when the vacuum suction switching valve function is off and closes the passage to the atmosphere side when the vacuum suction switching valve function is on. The vacuum suction switching valve function, the vacuum break switching valve function, and the open-to-atmosphere switching valve function are integrally incorporated into a body portion.

In the switching valve device according to the present invention, the open-to-atmosphere switching valve function is operated in conjunction with the operation of the vacuum suction switching valve function, and the passage to the atmosphere side is opened when the vacuum suction switching function is off and closed when it is on.

The vacuum suction switching valve function, the vacuum break switching valve function, and the open-to-atmosphere switching valve function are integrally incorporated into the body portion.

In the switching valve device according to the present invention, a throttle valve function can be provided on an outlet side of the vacuum break switching valve function. In this switching valve device, therefore, at the time of vacuum break, pressurized air throttled by the throttle valve function is supplied to an output port.

In the switching valve device according to the present invention, a relief valve function can be added to the throttle valve function. In this switching valve device having the throttle valve function with the relief valve function, at the time of vacuum break, first, pressurized air passes through the throttle valve function and the relief valve function and is supplied to the output port, and then, only pressurized air which has passed through the throttle valve is supplied to the output port.

In the switching valve device according to the present invention, the vacuum suction switching valve function and the open-to-atmosphere switching valve function can be operated mechanically in conjunction with each other. In this switching valve device, the vacuum suction switching valve function and the open-to-atmosphere valve function operate mechanically in conjunction with each other.

In the switching valve device according to the present invention, fluid passages which constitute the vacuum suction switching valve function, the vacuum break switching valve function, and the open-to-atmosphere switching valve function can be formed in a single valve body. In this switching valve device, the fluid passages which constitute the vacuum suction switching valve function, the vacuum break switching valve function, and the open-to-atmosphere switching valve function are formed in the single valve body.

In the switching valve device according to the present invention, a filter unit can be provided in a passage open to an atmosphere of the open-to-atmosphere switching valve function. In this switching valve device, the provision of the filter unit in the passage open to the atmosphere of the open-to-atmosphere switching valve function prevents the inflow of dust from the atmosphere side.

The switching valve device according to the present invention can have, as one aspect of the open-to-atmosphere switching valve function, a check valve which closes a passage to a vacuum side when the vacuum suction switching valve function is on and closes the passage to the atmosphere side when the vacuum break switching valve function. In this switching valve device, the open-to-atmosphere switching valve function is composed of the check valve, the passage to the vacuum side closes when the vacuum suction switching valve function is on, and the passage to the atmosphere side close when the vacuum break switching valve function is on.

A switching valve device according to the present invention includes a vacuum suction switching valve function for vacuum suction; a vacuum break switching valve function for vacuum break; and a throttle valve function with a relief function on an outlet side of the vacuum break switching valve function. The vacuum suction switching valve function, the vacuum break switching valve function, and the throttle valve function with the relief function are integrally incorporated into a body portion.

This switching valve device includes the throttle valve function with the relief function on the outlet side of the vacuum break switching valve function. At the time of vacuum break, first, pressurized air passes through the throttle valve function and the relief valve function and is supplied to the output port, and then, only pressurized air which has passed through the throttle valve is supplied to the output port. The vacuum suction switching valve function, the vacuum break switching valve function, and the throttle valve function with the relief function are integrally incorporated into the body portion.

In the switching valve device according to the present invention, the body portion is mounted on a sub-base or a manifold base. In this switching valve device, the body portion of the switching valve device is mounted on the sub-base or the manifold base.

The switching valve device according to the present invention can include a tank portion formed in the sub-base or the manifold base and being in communication with a vacuum port of the vacuum suction switching valve function. In this switching valve device, since the tank portion in the sub-base or the manifold base communicates with the vacuum port of the vacuum suction switching valve function, it is possible to prevent a drop in the degree of vacuum.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 9 is an explanatory view showing a state where the vacuum solenoid of the open-to-atmosphere switching valve function in FIG. 6 is off and the vacuum break solenoid thereof is on;

DESCRIPTION OF THE PREFERRED EMBODIMENT

The embodiments of the present invention will be described below with respect to the drawings.

First Embodiment

Figure 5:
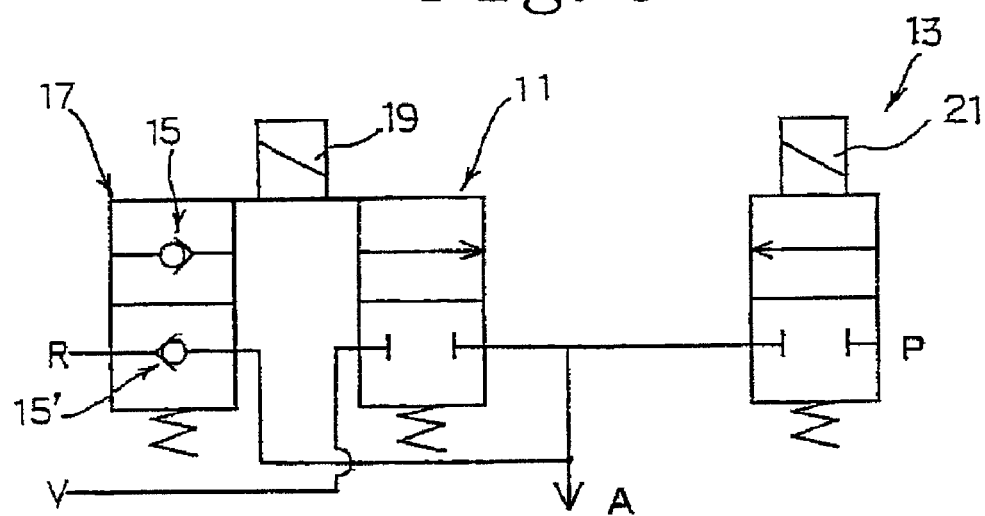
FIG. 5 is an explanatory view showing a functional circuit of the first embodiment of the switching valve device of the present invention.

FIG. 1 to FIG. 4 show a first embodiment of a switching valve device according to the present invention, and FIG. 5 is a functional circuit diagram showing a basic configuration of the switching valve device of the first embodiment.

First, the basic configuration of the switching valve device in this embodiment will be described based on the functional circuit diagram shown in FIG. 5.

The switching valve device according to the present embodiment includes a vacuum suction switching valve function 11 for vacuum suction and a vacuum break switching valve function 13 for vacuum break.

The vacuum suction switching valve function 11 is composed of a 2-port/2-position electromagnetic switching valve, and a vacuum port V is connected to a vacuum source not shown.

The vacuum break switching valve function 13 is composed of a 2-port/2-position electromagnetic switching valve, and a pressurization port P is connected to a pressurization source not shown.

An open-to-atmosphere switching valve function 17 is provided adjacent to the vacuum suction switching valve function 11.

This open-to-atmosphere switching valve function 17 is composed of a 2-port electromagnetic switching valve, and shares a vacuum solenoid 19 of the vacuum suction switching valve function 11.

The open-to-atmosphere switching valve function 17 includes a check valve 15 and a check valve 15'.

This open-to-atmosphere switching valve function 17 closes a passage from an open-to-atmosphere port R to a vacuum side by the check valve 15 when the shared vacuum solenoid 19 of the vacuum suction switching valve function 11 is on and a vacuum break solenoid 21 of the vacuum break switching valve function 13 is off.

Further, it closes a passage to the open-to-atmosphere port R by the check valve 15' when the vacuum solenoid 19 is off and the vacuum break solenoid 21 is on.

Next, a concrete configuration of the switching valve device of the first embodiment will be described in detail using FIG. 1 to FIG. 4.

The switching valve device of the first embodiment includes a rectangular parallelepiped-shaped valve body 23.

The vacuum solenoid 19 of the vacuum suction switching valve function 11 is placed on one side surface of the valve body 23, and the vacuum break solenoid 21 of the vacuum break switching valve function 13 is placed on the other side surface.

Figure 2:
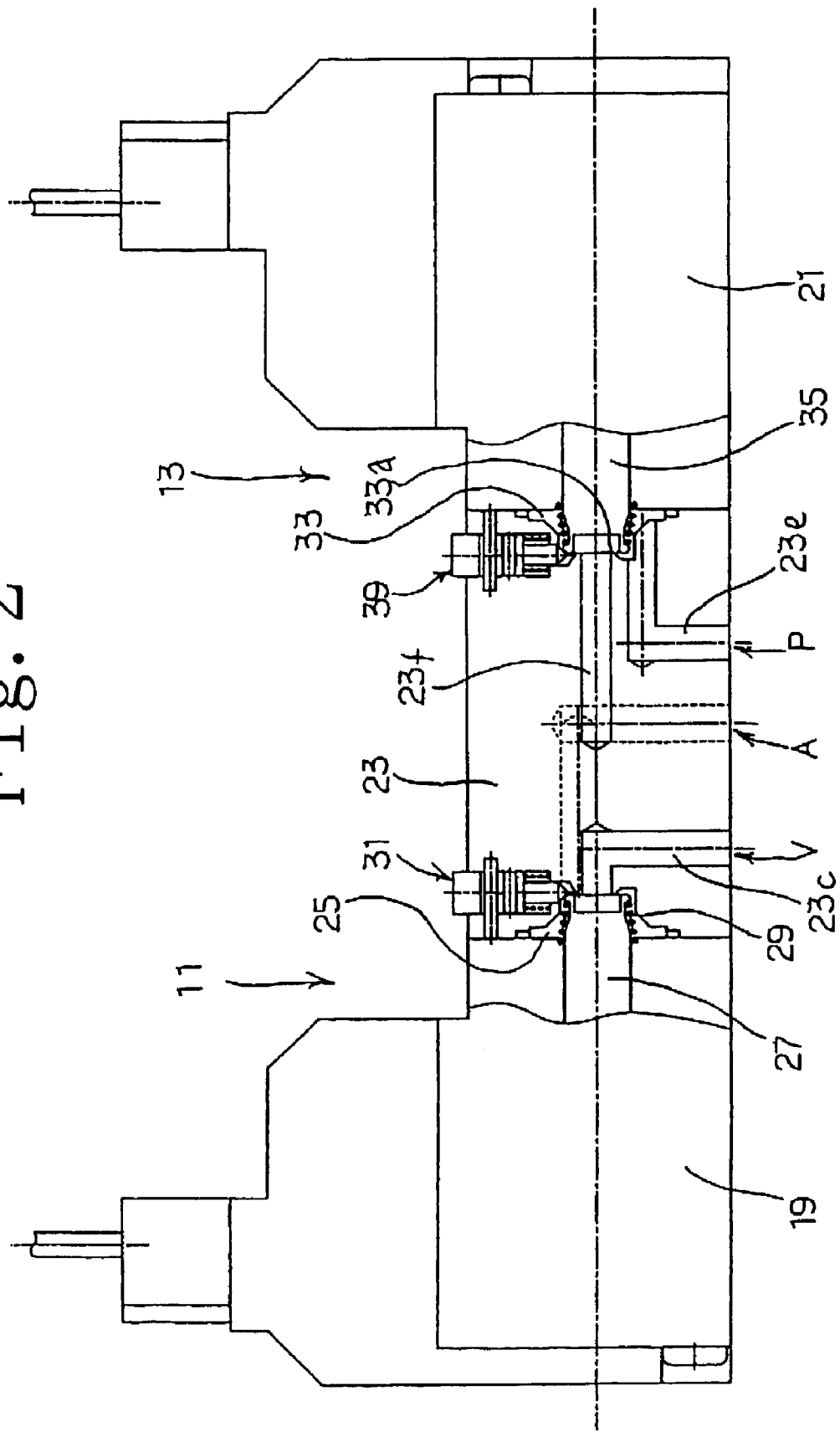
FIG. 2 is a sectional view along the line B-B in FIG. 3 showing the first embodiment of the switching valve device of the present invention.

As shown in FIG. 2, an output port A is open in the center of a bottom surface of the valve body 23.

Further, the vacuum port V of the vacuum suction switching valve function 11 is open on the vacuum solenoid 19 side of the bottom surface of the valve body 23.

Furthermore, the pressurization port P of the vacuum break switching valve function 13 is open on the vacuum break solenoid 21 side of the bottom surface of the valve body 23.

Figure 3:
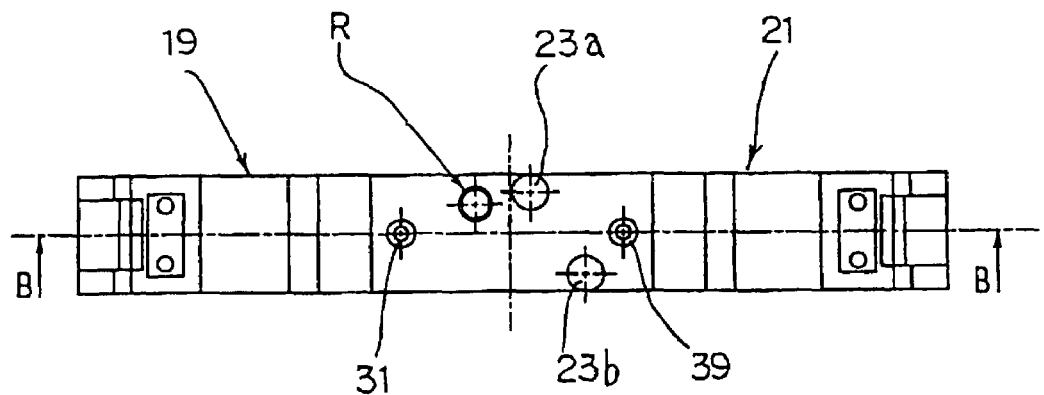
FIG. 3 is a top view showing the first embodiment of the switching valve device of the present invention.
Figure 4:
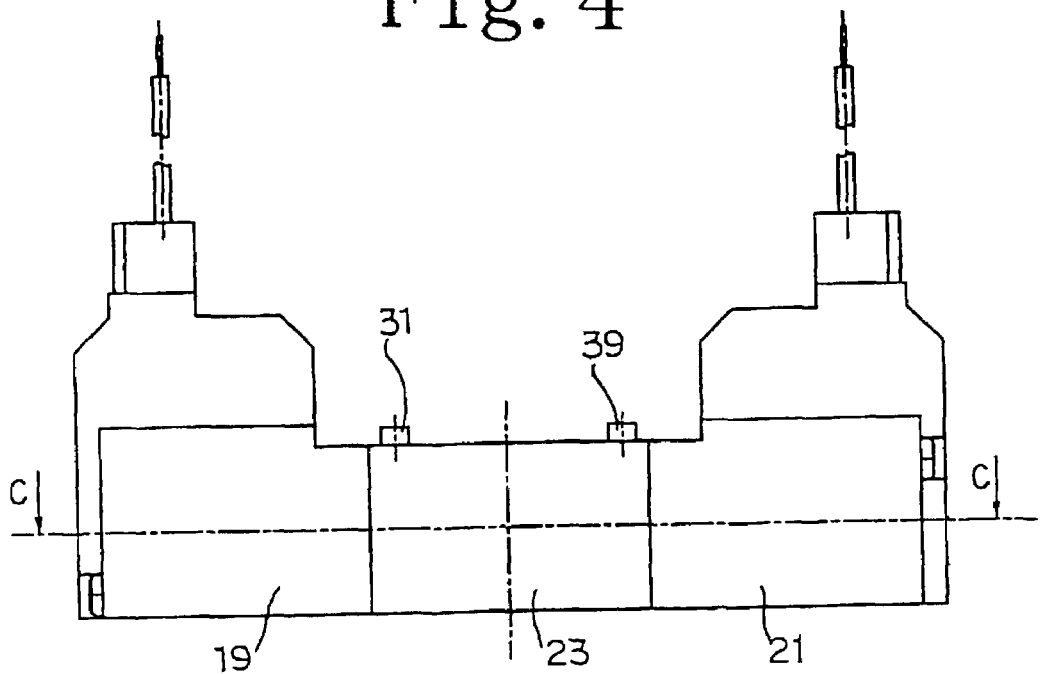
FIG. 4 is a side view showing the first embodiment of the switching valve device of the present invention.

As shown in FIG. 3, the open-to-atmosphere port R of the open-to-atmosphere switching valve function 17 is open on the vacuum solenoid 19 side of a top surface of the valve body 23.

Further, mounting holes 23a and 23b which penetrate the valve body 23 in a top-to-bottom direction are formed in the top surface of the valve body 23.

As shown in FIG. 2, a vacuum-side valve chamber 25 is formed on the vacuum solenoid 19 side of the valve body 23.

This vacuum-side valve chamber 25 is open to the vacuum port V via a passage 23c.

Figure 1:
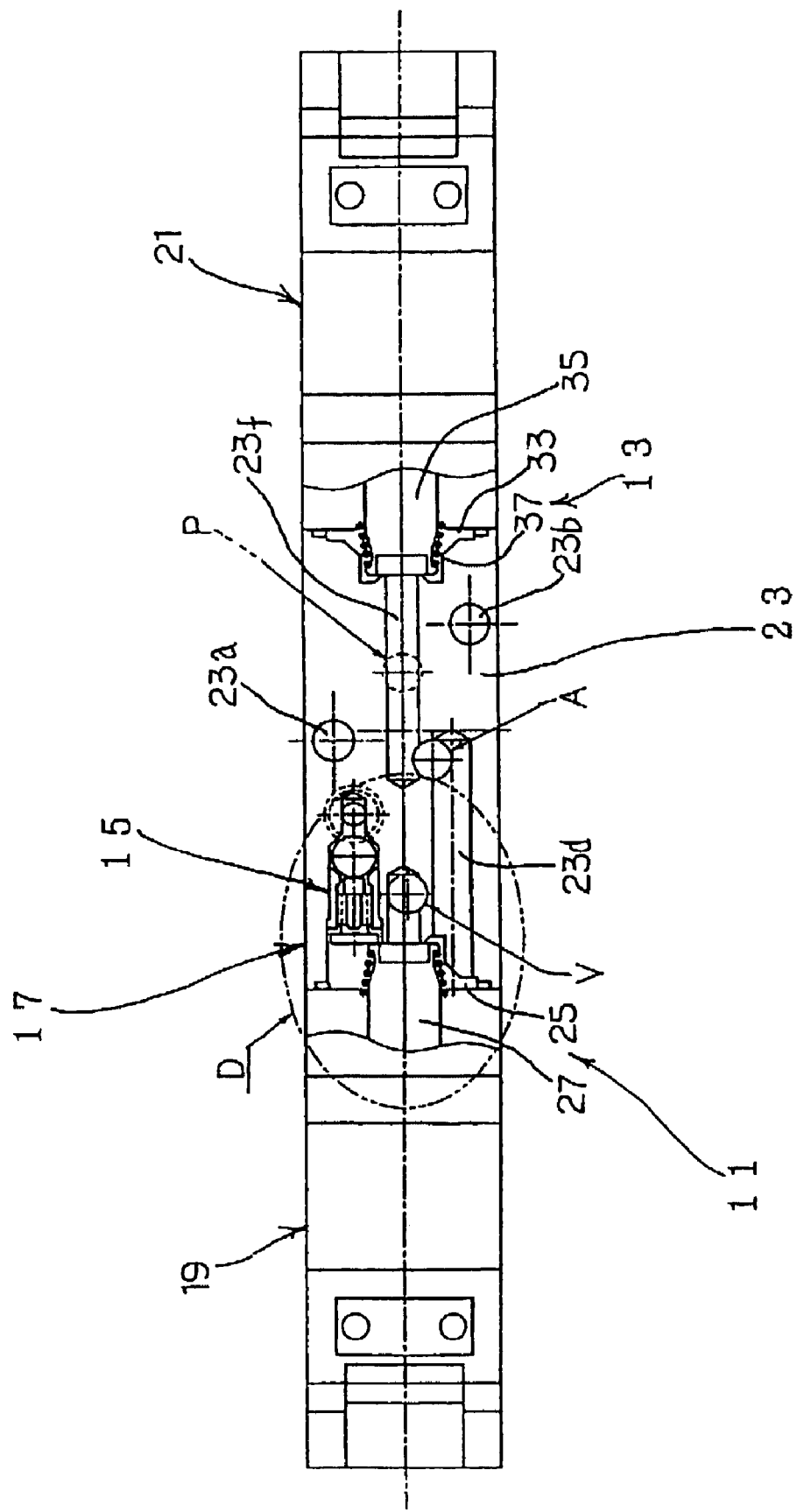
FIG. 1 is a sectional view along the line C-C in FIG. 4 showing a first embodiment of a switching valve device of the present invention.

Further, this vacuum-side valve chamber 25 is open to the output port A via a passage 23d as shown in FIG. 1.

As shown in FIG. 2, a forward end of a plunger 27 of the vacuum solenoid 19 is positioned in the vacuum-side valve chamber 25.

The plunger 27 is biased to the valve body 23 side by a coil spring 29.

A manual switching valve 31 is placed on top of the vacuum-side valve chamber 25 of the valve body 23.

A pressurization-side valve chamber 33 is formed on the vacuum break solenoid 21 side of the valve body 23.

This pressurization-side valve chamber 33 is open to the pressurization port P via a passage 23e.

Further, as shown in FIG. 1, this pressurization-side valve chamber 33 is open to the output port A via a passage 23f.

As shown in FIG. 2, a forward end of a plunger 35 of the vacuum break solenoid 21 is positioned in the pressurization-side valve chamber 33.

The plunger 35 is biased to the valve body 23 side by a coil spring 37.

A manual switching valve 39 is placed on top of the pressurization-side valve chamber 33 of the valve body 23.

In this embodiment, as shown in FIG. 1, the open-to-atmosphere switching valve function 17 is placed on the vacuum solenoid 19 side of the valve body 23.

This open-to-atmosphere switching valve function 17 is structured to operate mechanically in conjunction with the plunger 27 of the vacuum solenoid 19.

Figure 6:
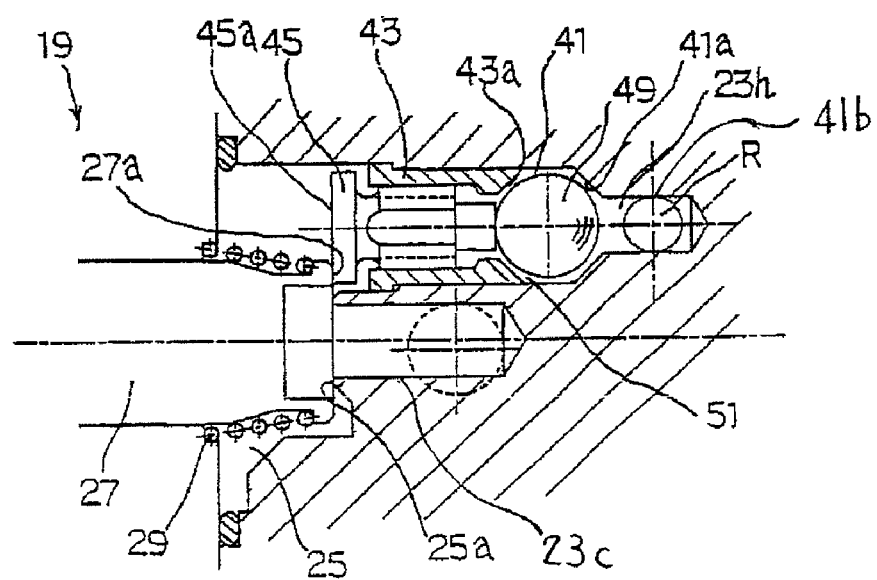
FIG. 6 is an explanatory view showing an open-to-atmosphere switching valve function of the first embodiment of the switching valve device of the present invention in an enlarged form.

Namely, as in FIG. 6 which shows a portion D in FIG. 1 in an enlarged form, an atmosphere-side valve chamber 41 is formed open to the vacuum-side valve chamber 25 in parallel to an axis of the plunger 27 of the vacuum solenoid 19.

A forward end of this atmosphere-side valve chamber 41 is open to the open-to-atmosphere port R via a passage 23h.

A cylindrical valve seat member 43 is fixed in the atmosphere-side valve chamber 41.

An open-to-atmosphere plunger 45 is movably inserted into the valve seat member 43.

A rear end surface 45a of this open-to-atmosphere plunger 45 abuts on a forward end surface 27a of the plunger 27 of the vacuum solenoid 19.

Figure 7:
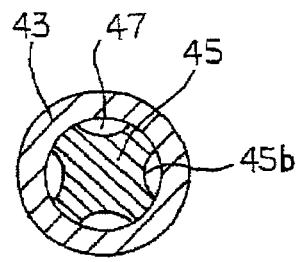
FIG. 7 is an explanatory view showing an open-to-atmosphere plunger of the open-to-atmosphere switching valve function in FIG. 6.

As shown in FIG. 7, recessed portions 45b are formed at an outer periphery of the open-to-atmosphere plunger 45, so that gaps 47 are formed between the valve seat member 43 and the open-to-atmosphere plunger 45.

A spherical valve 49 made of an elastic body such as rubber is placed on the open-to-atmosphere port R side of the open-to-atmosphere plunger 45.

This spherical valve 49 can seal a valve seat 43a formed at a forward end of the valve seat member 43 and a valve seat 41a formed on the open-to-atmosphere port R side of the atmosphere-side valve chamber 41.

The operation of the above-described switching valve device will be described below.

In the above-described switching valve device, as shown in FIG. 6, the vacuum-side valve chamber 25 on the vacuum solenoid 19 side communicates with the open-to-atmosphere port R when the vacuum solenoid 19 and the vacuum break solenoid 21 are off.

More specifically, in this state, the plunger 27 of the vacuum solenoid 19 is pressed against a valve seat 25a of the vacuum-side valve chamber 25 by the coil spring 29, and the rear end surface 45a of the open-to-atmosphere plunger 45 is pressed to the spherical valve 49 side by the forward end surface 27a of the plunger 27.

This pressing forms a gap 51 between the valve seat 43a of the valve seat member 43 and the spherical valve 49, so that the interior of the vacuum-side valve chamber 25 communicates with the open-to-atmosphere port R via the gaps 47 between the valve seat member 43 and the open-to-atmosphere plunger 45 and the gap 51 between the valve seat 43a of the valve seat member 43 and the spherical valve 49.

Figure 8:
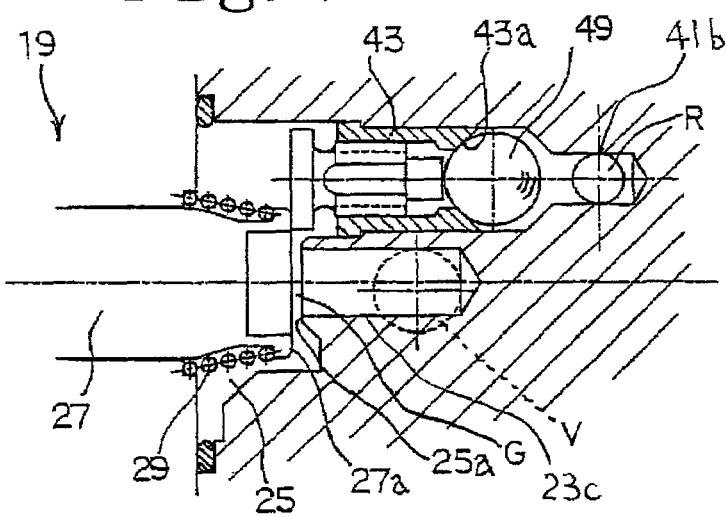
FIG. 8 is an explanatory view showing a state where a vacuum solenoid of the open-to-atmosphere switching valve function in FIG. 6 is on and a vacuum break solenoid thereof is off.

If a suction signal is applied to the vacuum solenoid 19 in this state, as shown in FIG. 8, the plunger 27 of the vacuum solenoid 19 is attracted to the left side of the figure by electromagnetic force against biasing force of the coil spring 29.

Consequently, a gap G is formed between the forward end surface 27a of the plunger 27 and the valve seat 25a of the vacuum-side valve chamber 25, so that the vacuum-side valve chamber 25 communicates with the vacuum port V.

If the vacuum-side valve chamber 25 is evacuated by this communication, the spherical valve 49 is attached by suction to the valve seat 43a of the valve seat member 43, and the communication with the open-to-atmosphere port R is cut off by the spherical valve 49.

Since the vacuum-side valve chamber 25 communicates with the output port A via the passage 23d as shown in FIG. 1, air in the output port A is evacuated, and the transfer and the like of a workpiece is performed in this state.

If the vacuum solenoid 19 is turned off in this state, as shown in FIG. 6, the plunger 27 of the vacuum solenoid 19 is pressed against the valve seat 25a of the vacuum-side valve chamber 25 by the coil spring 29, and the rear end surface 45a of the open-to-atmosphere plunger 45 is pressed to the spherical valve 49 side by the forward end surface 27a of the plunger 27.

This pressing forms the gap 51 between the valve seat 43a of the valve seat member 43 and the spherical valve 49, so that the interior of the vacuum-side valve chamber 25 communicates with the open-to-atmosphere port R via the gaps 47 between the valve seat member 43 and the open-to-atmosphere plunger 45 and the gap 51 between the valve seat 43a of the valve seat member 43 and the spherical valve 49.

A vacuum in the vacuum-side valve chamber 25 is broken by this communication, and the pressures in the vacuum-side valve chamber 25 and the output port A change toward the atmospheric pressure.

When the vacuum break solenoid 21 is turned on after a predetermined time elapses, the plunger 35 of the vacuum break solenoid 21 shown in FIG. 1 and FIG. 2 is attracted to the right sides of the figures by electromagnetic force against biasing force of the coil spring 37.

As a result, a gap is formed between a forward end surface of the plunger 35 and a valve seat 33a of the pressurization-side valve chamber 33, so that the pressurization-side valve chamber 33 communicates with the output port A via the passage 23f and the pressure in the output port A abruptly approaches the atmospheric pressure.

Moreover, since the output port A communicates with the vacuum-side valve chamber 25 on the vacuum solenoid 19 side via the passage 23d, pressurized air is supplied to the vacuum-side valve chamber 25.

Figure 9:
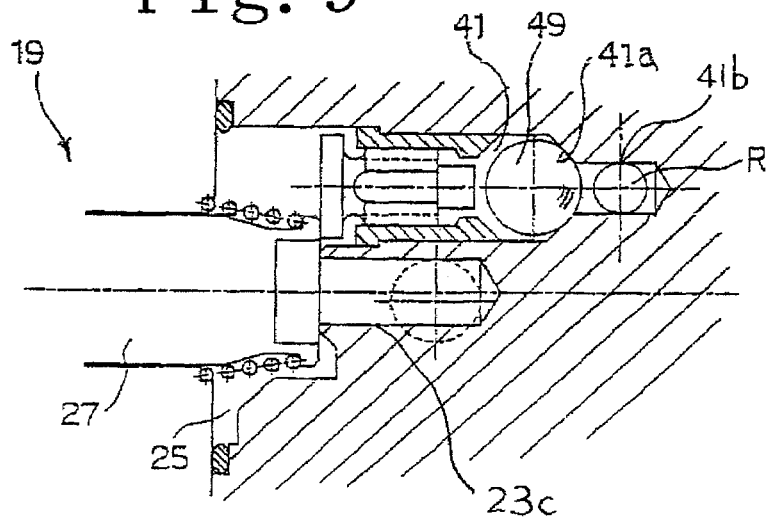

When the vacuum-side valve chamber 25 is pressurized by this supply, as shown in FIG. 9, the spherical valve 49 is pressed against the valve seat 41a of the atmosphere-side valve chamber 41, and communication with the open-to-atmosphere port R is cut off by the spherical valve 49.

Figure 10:
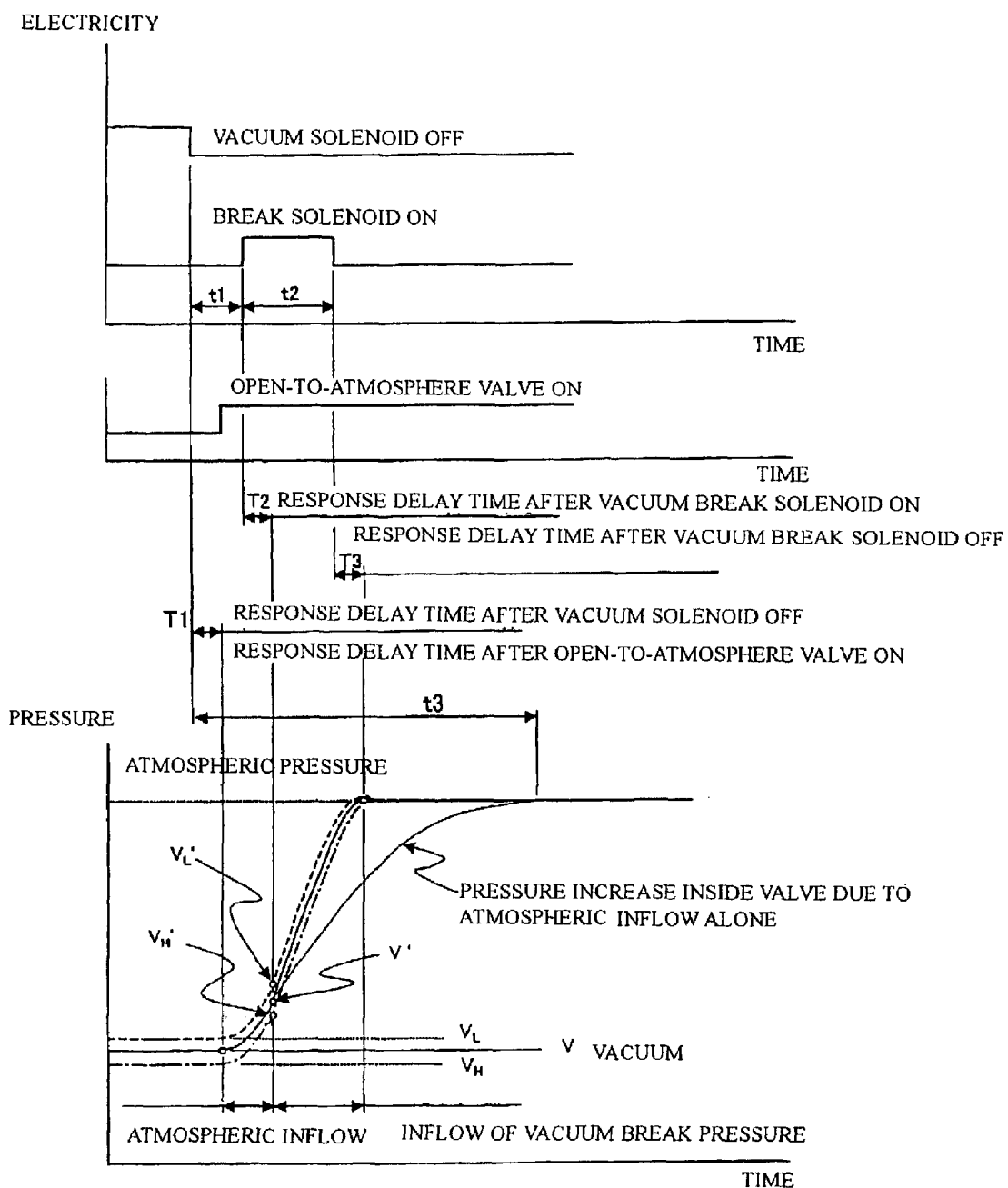
FIG. 10 is an explanatory view showing a pressure change characteristic of the first embodiment of the switching valve device of the present invention.

FIG. 10 shows a pressure change characteristic of the above-described switching valve device.

In this switching valve device, the vacuum solenoid 19 is turned off a response delay time T1 after an electrical signal to the vacuum solenoid 19 is turned off, ceasing the supply of vacuum pressure. At this time, the open-to-atmosphere switching valve function 17 which operates mechanically in conjunction therewith is turned on simultaneously, so that the atmosphere is introduced from the open-to-atmosphere port R, increasing the pressure in the output port A.

Since the introduced pressure is the atmospheric pressure, there is initially an abrupt increase of the pressure therein, but as the pressure therein approaches the atmospheric pressure, the increase becomes gradual. From the turning-on of the electrical signal to the vacuum solenoid 19, it takes a time t3 for the pressure in the output port A to reach the atmospheric pressure.

However, if an electrical signal is supplied to the vacuum break solenoid 21 the time t1 after the vacuum solenoid 19 is turned off, positive pressure for vacuum break is further supplied thereto, so that the pressure in the output port A sharply converges to the atmospheric pressure.

Similarly with the conventional technique, the electrical signal is supplied to the vacuum break solenoid 21 and the positive pressure for vacuum break is forcibly supplied thereto after the vacuum solenoid 19 is turned off.

However, introducing the atmospheric pressure after the turning-off of the vacuum solenoid 19 allows the internal pressure of the output port A to be closer to the atmospheric pressure when the vacuum break pressure is applied than in a general usage, which makes it possible to shorten the period of time when power is applied to the vacuum break solenoid 21, that is, the vacuum break solenoid 21 is on. This leads to a reduction in overshoot at a pressure close to the atmospheric pressure.

The above-described switching valve device is configured such that the open-to-atmosphere switching valve function 17 is operated in conjunction with the vacuum suction switching valve function 11. Therefore, the vacuum side operates automatically in conjunction with the atmosphere side before the pressure air flows in from the vacuum suction switching valve function 11, to cause the pressure in the output port A to approach the atmospheric pressure. Pressure air having a pressure higher than the atmospheric pressure flows in from the vacuum break switching valve function 13 after the pressure becomes close to the atmosphere pressure, which makes it possible to hold down the amount of overshoot and consequently break a vacuum rapidly and smoothly.

Further, operating the open-to-atmosphere switching valve function 17 in conjunction with the vacuum suction switching valve function 11 results in increasing the vacuum pressure at the time vacuum break of the vacuum break switching valve function 13 starts and reducing variations in vacuum pressure, which enables stable transfer and detachment of a product.

Furthermore, the integral incorporation of the vacuum suction switching valve function 11, the vacuum break switching valve function 13, and the open-to-atmosphere switching valve function 17 makes it possible to make the switching valve device compact and downsize it and to provide the switching valve device at a low price.

Moreover, in the above-described switching valve device, the vacuum suction switching valve function 11 and the open-to-atmosphere switching valve function 17 are operated mechanically in conjunction with each other, which can heighten reliability of the device.

In the above-described switching valve device, fluid passage which constitute the vacuum suction switching valve function 11, the vacuum break switching valve function 13, and the open-to-atmosphere switching valve function 17 are formed in the single valve body 23, which makes it possible to reduce the number of parts and obtain a small, compact switching valve device.

Also, the above-described switching valve device is configured such that the open-to-atmosphere switching valve function 17 is composed of the check valve 15, the passage to the vacuum side is closed when the vacuum suction switching valve function 11 is on, and the passage to the atmosphere side is closed when the vacuum break switching valve function 13 is on, which makes it possible to realize a simple and reliable open-to-atmosphere switching valve function 17.

Second Embodiment

Figure 11:
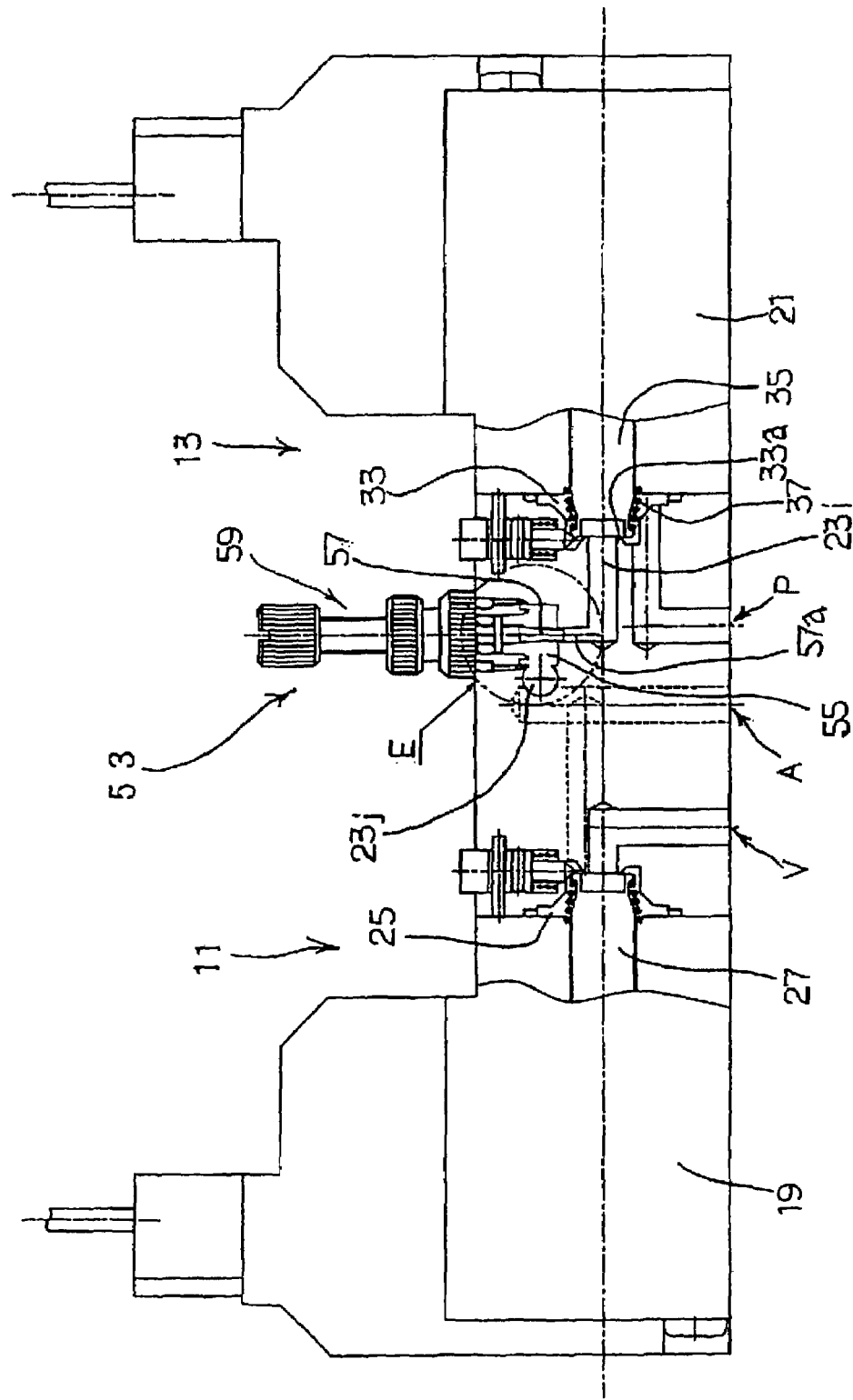
FIG. 11 is a sectional view showing a second embodiment of the switching valve device of the present invention.
Figure 12:
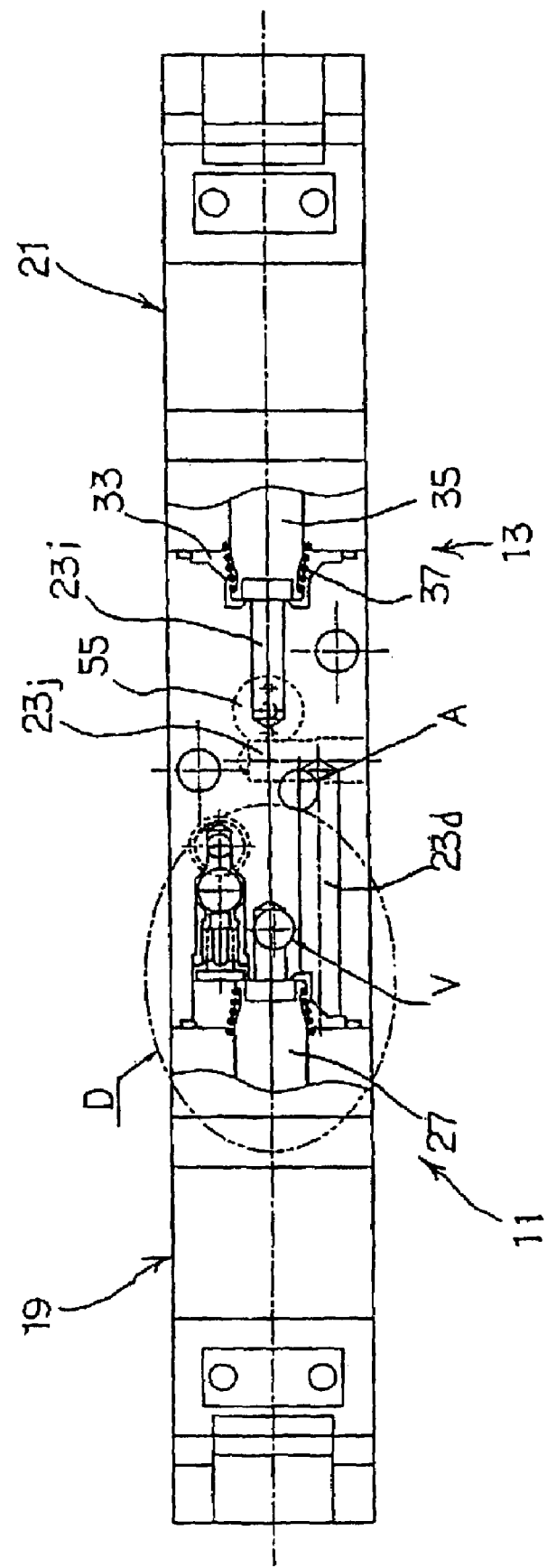
FIG. 12 is a sectional view showing the second embodiment of the switching valve device of the present invention.
Figure 13:
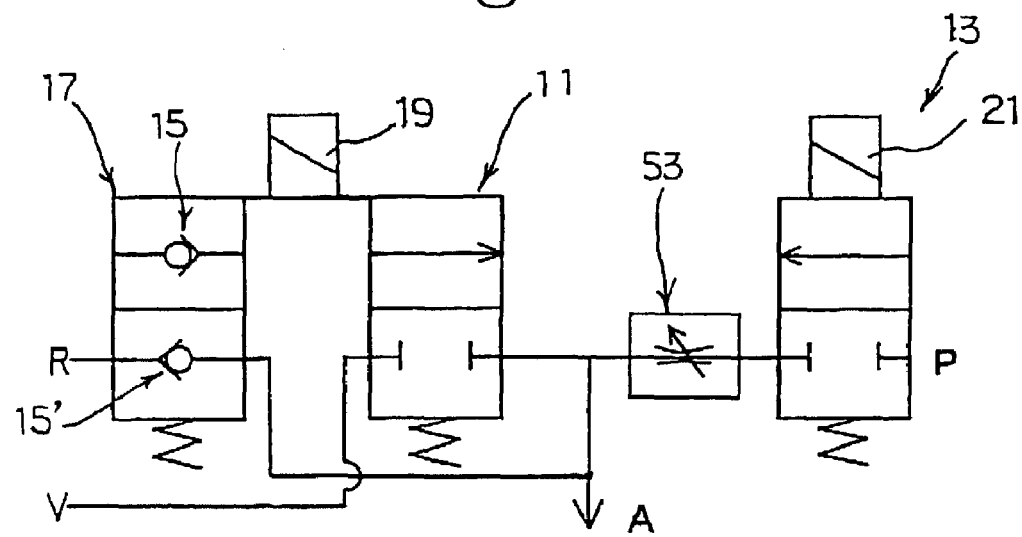
FIG. 13 is an explanatory view showing a functional circuit of the second embodiment of the switching valve device of the present invention.

FIG. 11 and FIG. 12 show a second embodiment of the switching valve device of the present invention, and FIG. 13 is a functional circuit diagram showing a basic configuration of the switching valve device of the second embodiment.

Incidentally, in this embodiment, the same numerals and symbols will be used to designate the same members as those in the first embodiment, and a detailed description thereof will be omitted.

In the switching valve device according to the present embodiment, a throttle valve function 53 is provided on the output port A side of the vacuum break switching valve function 13 as shown in FIG. 13.

This throttle valve function 53 is formed on the vacuum break solenoid 21 side of the valve body 23 as shown in FIG. 11 and FIG. 12.

Namely, a throttle valve chamber 55 is formed at a top surface of the valve body 23.

A throttle valve 57 having a tapered forward end is housed in this throttle valve chamber 55.

The throttle valve 57 is supported by an operation portion 59, and the throttle amount can be set by manual operation of the operation portion 59.

A throttle hole 57a is open in a bottom surface of the throttle valve chamber 55.

This throttle hole 57a is connected to a passage 23i which is open to the valve seat 33a of the pressurization-side valve chamber 33.

Further, the throttle valve chamber 55 is connected to the output port A via a passage 23j.

In the switching valve device according to the present embodiment, when the vacuum break solenoid 21 is turned on, the plunger 35 of the vacuum break solenoid 21 is attracted to the right sides of the figures by electromagnetic force against biasing force of the coil spring 37.

As a result, a gap is formed between the forward end surface of the plunger 35 and the valve seat 33a of the pressurization-side valve chamber 33, so that the pressurization-side valve chamber 33 communicates with the throttle valve chamber 55 via the passage 23i.

Figure 14:
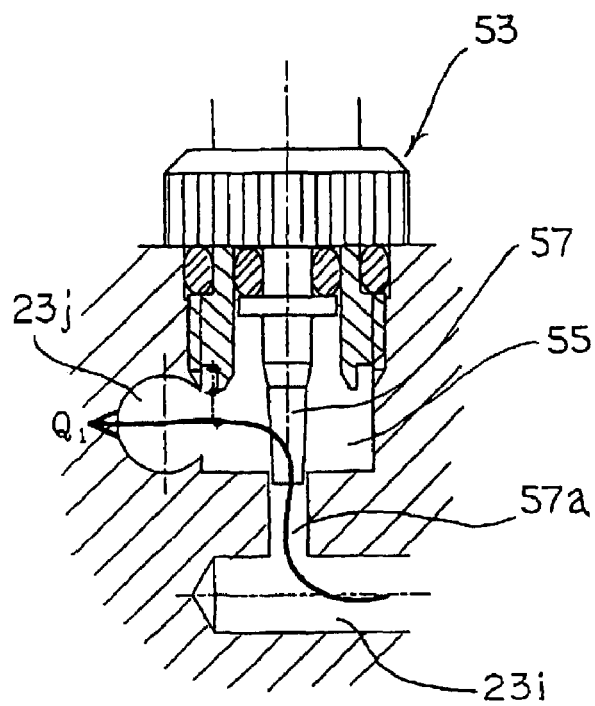
FIG. 14 is an explanatory view showing a throttle valve function of the second embodiment of the switching valve device of the present invention in an enlarged form.

As in FIG. 14 which shows details of a portion E in FIG. 11, pressurized air from the passages 23i and 57a is throttled by the throttle valve 57 and thereafter supplied to the output port A via the passage 23j.

Figure 15:
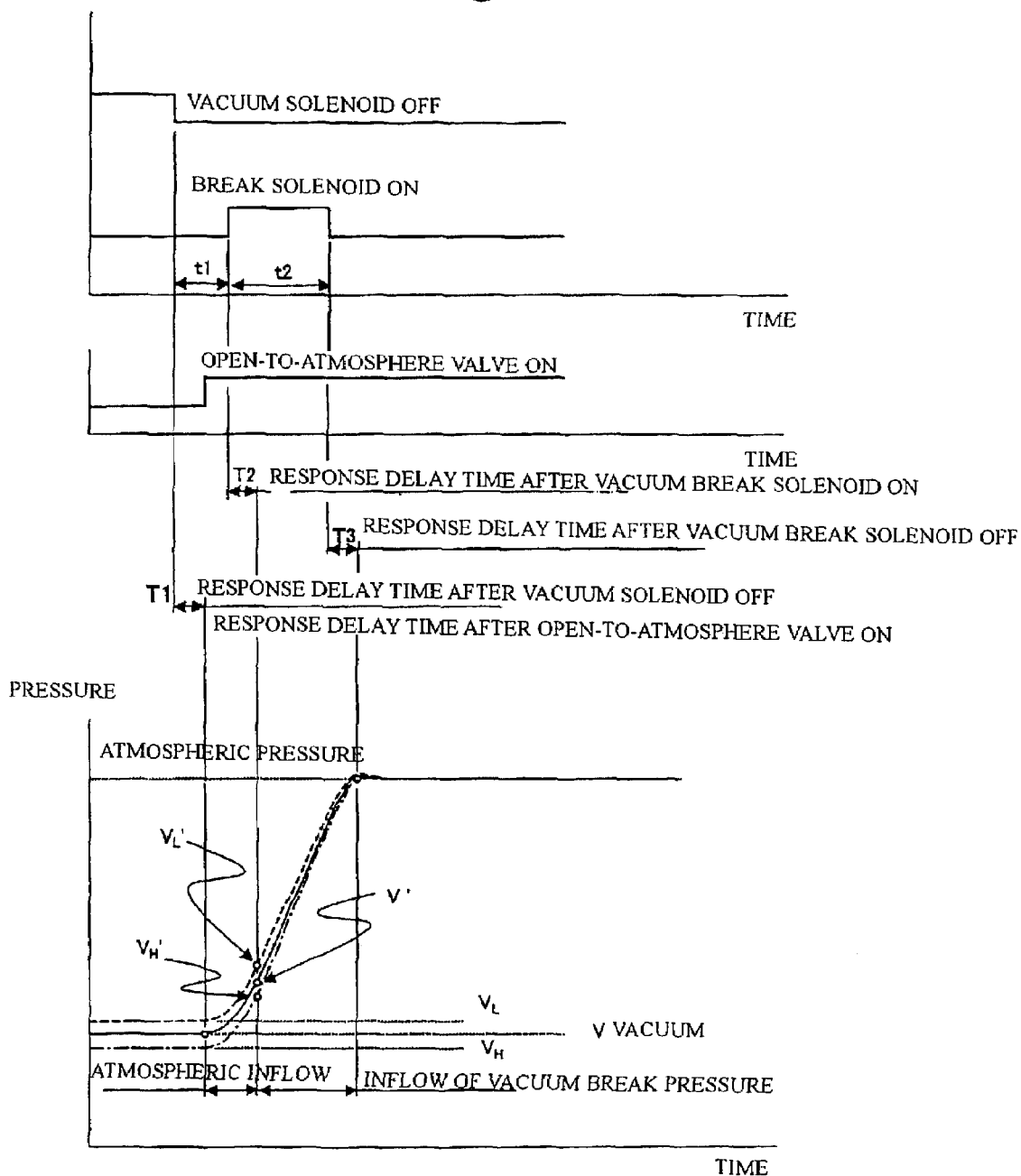
FIG. 15 is an explanatory view showing a pressure change characteristic of the second embodiment of the switching valve device of the present invention.

FIG. 15 shows a pressure change characteristic of the switching valve device according to the present embodiment.

In this switching valve device, a series of changes until the vacuum break solenoid 21 is turned on are about the same as in the first embodiment.

An electrical signal is supplied to the vacuum break solenoid 21, and after a delay time T2 elapses, vacuum break pressure flows into the output port A.

The inflow rate of the vacuum break pressure flowing this time is adjusted by the throttle valve 57, so that a pressure increase characteristic is to be more ideal.

In the switching valve device according to the present embodiment, the throttle valve function 53 is provided on the outlet side of the vacuum break switching valve function 13, and at the time of vacuum break, the pressurized air throttled by the throttle valve function 53 is supplied to the output port A, whereby overshoot can be reduced more certainly.

Third Embodiment

Figure 16:
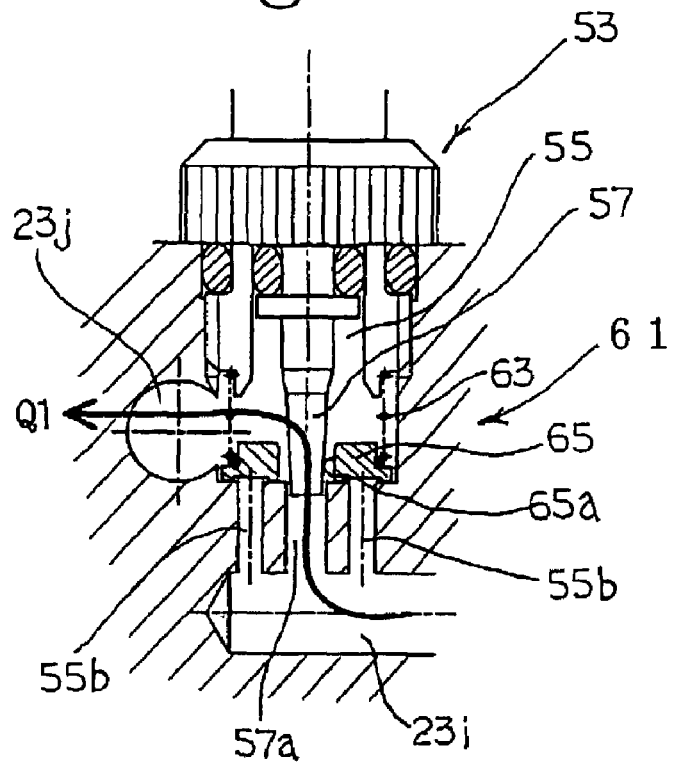
FIG. 16 is a sectional view showing a principal part of a third embodiment of the switching valve device of the present invention.
Figure 17:
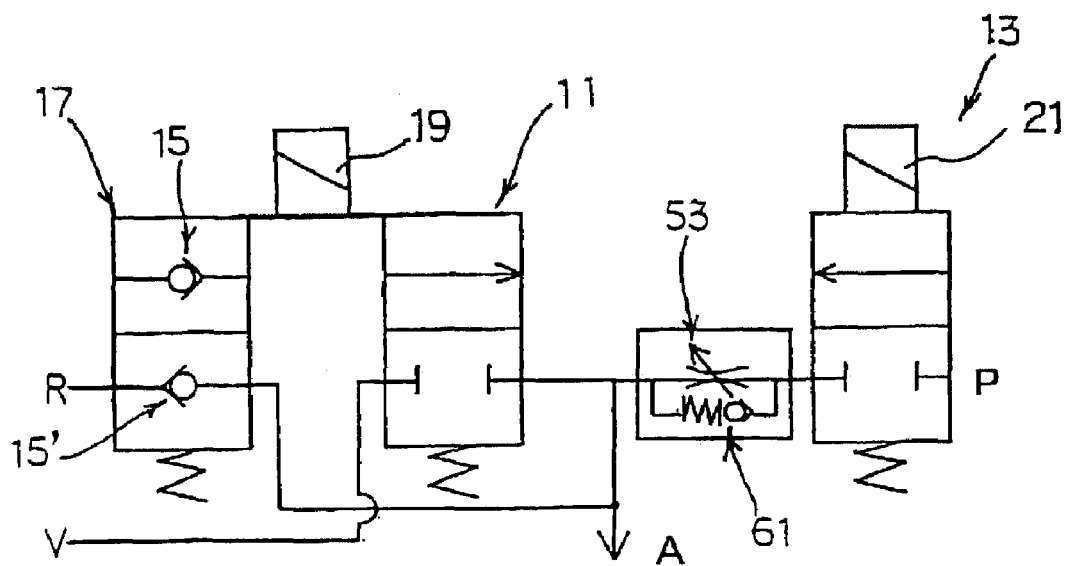
FIG. 17 is an explanatory view showing a functional circuit of the third embodiment of the switching valve device of the present invention.

FIG. 16 shows a principal portion of a third embodiment of the switching valve device of the present invention, and FIG. 17 is a functional circuit diagram showing a basic configuration of the switching valve device of the third embodiment.

In this embodiment, the same numerals and symbols will be used to designate the same members as those in the first and second embodiments, and a detailed description thereof will be omitted.

In the switching valve device according to the present embodiment, as shown in FIG. 17, the throttle valve function 53 having a relief valve function 61 added thereto is provided on the output port A side of the vacuum break switching valve function 13.

As shown in FIG. 16, the throttle valve function 53 is configured similarly to the throttle valve function 53 in the second embodiment.

The relief valve function 61 composed of a coil spring 63 and a relief seat 65 is placed at the bottom of the throttle valve chamber 55.

The coil spring 63 is placed between a mounting portion 67 of the throttle valve function 53 and the relief seat 65, and the relief seat 65 is biased toward a bottom surface of the throttle valve chamber 55.

A through hole 65a into which a forward end of the throttle valve 57 is inserted is formed in a center of the relief seat 65.

In the bottom surface of the throttle valve chamber 55, plural passages 55b which are open to a bottom surface of the relief seat 65 are formed.

The passages 55b are connected to the passage 23i which is open to the valve seat 33a of the pressurization-side valve chamber 33.

The throttle valve chamber 55 is connected to the output port A via the passage 23j.

Figure 18:
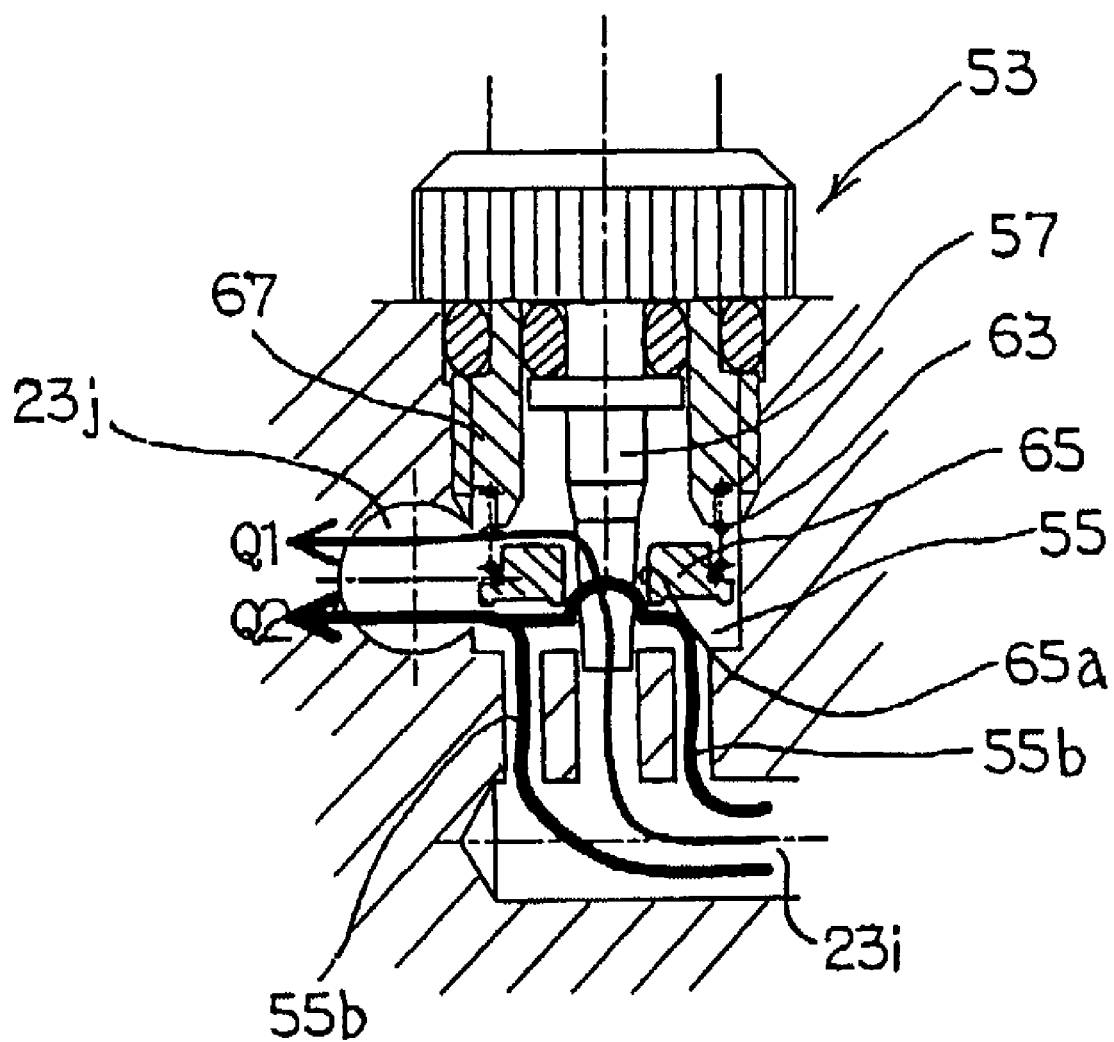
FIG. 18 is an explanatory view showing a state where a relief seat is open in FIG. 16.

In the switching valve device according to the present embodiment, as shown in FIG. 18, pressurized air from the passages 55b pushes up the relief seat 65 against biasing force of the coil spring 63, and the pressurized air is supplied to the output port A through a gap between the bottom surface of the relief seat 65 and the bottom surface of the throttle valve chamber 55 and a gap between the throttle valve 57 and the through hole 65a of the relief seat 65 and via the passage 23j.

As a result of this supply, the pressure in the output port A abruptly approaches the atmospheric pressure, and the differential pressure with respect to the pressure in the throttle valve chamber 55 decreases. The relief seat 65 cuts off the passage 55b by biasing force of the coil spring 63 as shown in FIG. 16, and only the pressurized air which has passed through the gap between the throttle valve 57 and the through hole 65a of the relief seat 65 and been throttled by the throttle valve 57 is supplied to the output port A.

Figure 19:
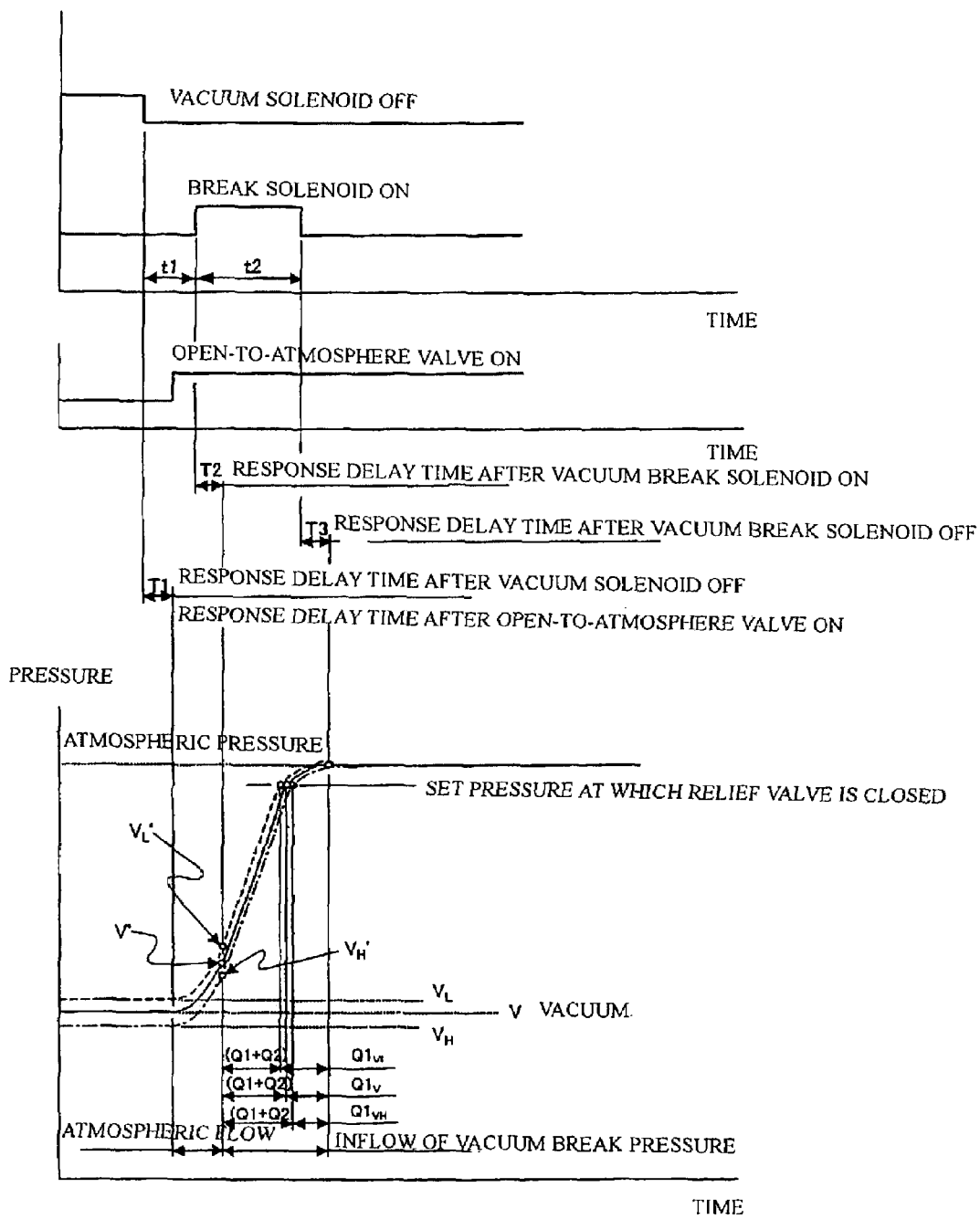
FIG. 19 is an explanatory view showing a pressure change characteristic of the third embodiment of the switching valve device of the present invention.

FIG. 19 shows a pressure change characteristic of the switching valve device according to the present embodiment.

In this switching valve device, the relief seat 65 operates when vacuum break pressure is supplied. The flow of the vacuum break pressure into the output port A is a sum of the flow Q2 passing through an opening portion of the relief seat 65 and the flow Q1 passing through the throttle valve 57. The relief seat 65, set to close at a certain pressure, closes when the pressure reaches the certain pressure. Thereafter, the vacuum break pressure is only the flow Q1 passing through the throttle valve 57. Q1 is adjusted appropriately, so that pressure increase due to Q1 is gradual.

Namely, after the introduction of the atmosphere, a large flow Q1+Q2 of the vacuum break pressure flows until the pressure reaches to the set pressure, closing the relief seat 65. Thereafter, the vacuum break pressure is only the flow Q1 through the throttle valve function 53, therefore the pressure increases gently to the atmospheric pressure.

In the switching valve device according to the present embodiment, the relief valve function 61 is added to the throttle valve function 53 of the second embodiment. At the time of vacuum break, first, pressurized air which has passed through the throttle valve function 53 and the relief valve function 61 is supplied to the output port A, and then, only pressurized air which has passed through the throttle valve 53 is supplied to the output port A, whereby overshoot can be reduced more certainly.

Fourth Embodiment

Figure 20:
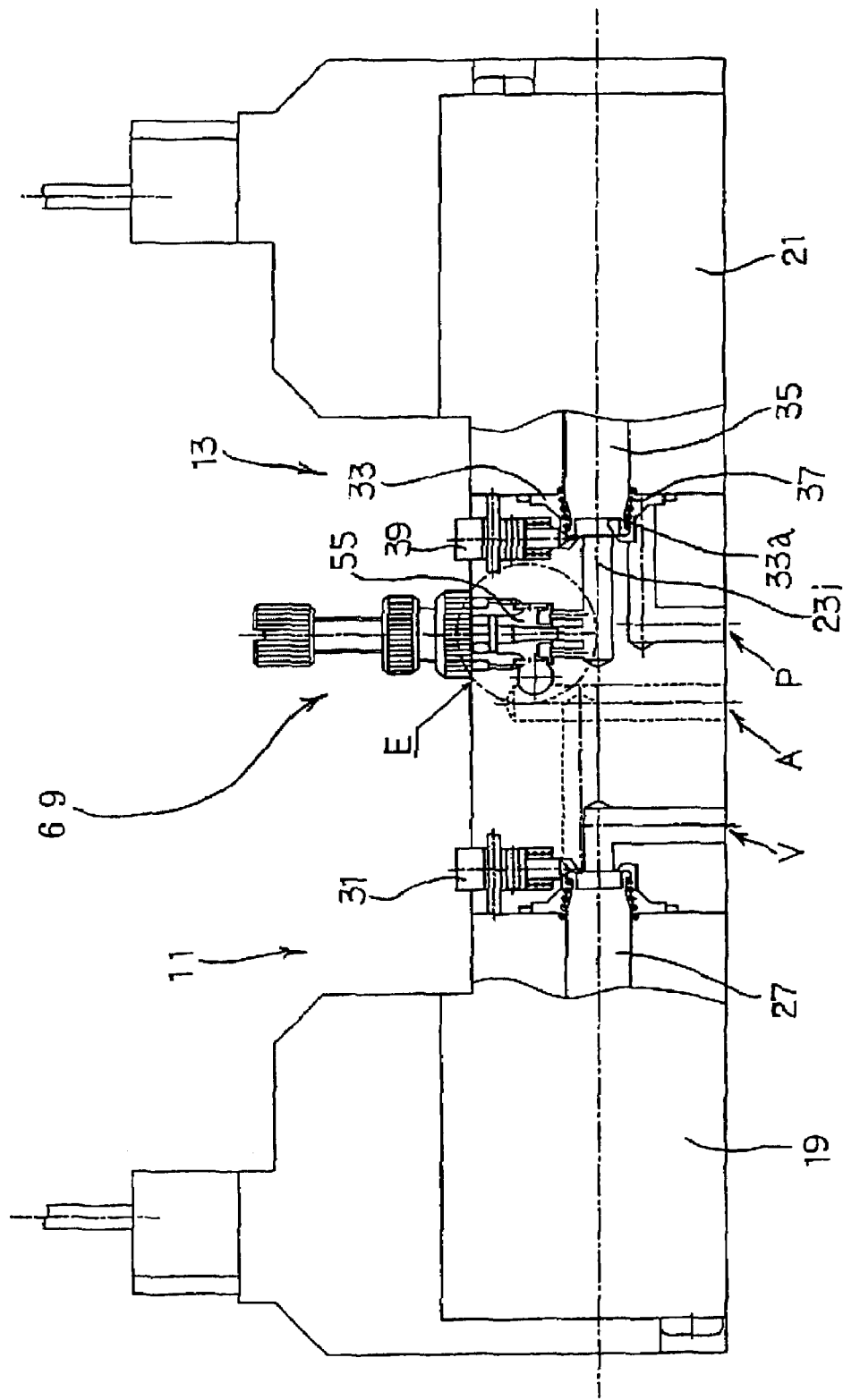
FIG. 20 is a sectional view showing a fourth embodiment of the switching valve device of the present invention.
Figure 21:
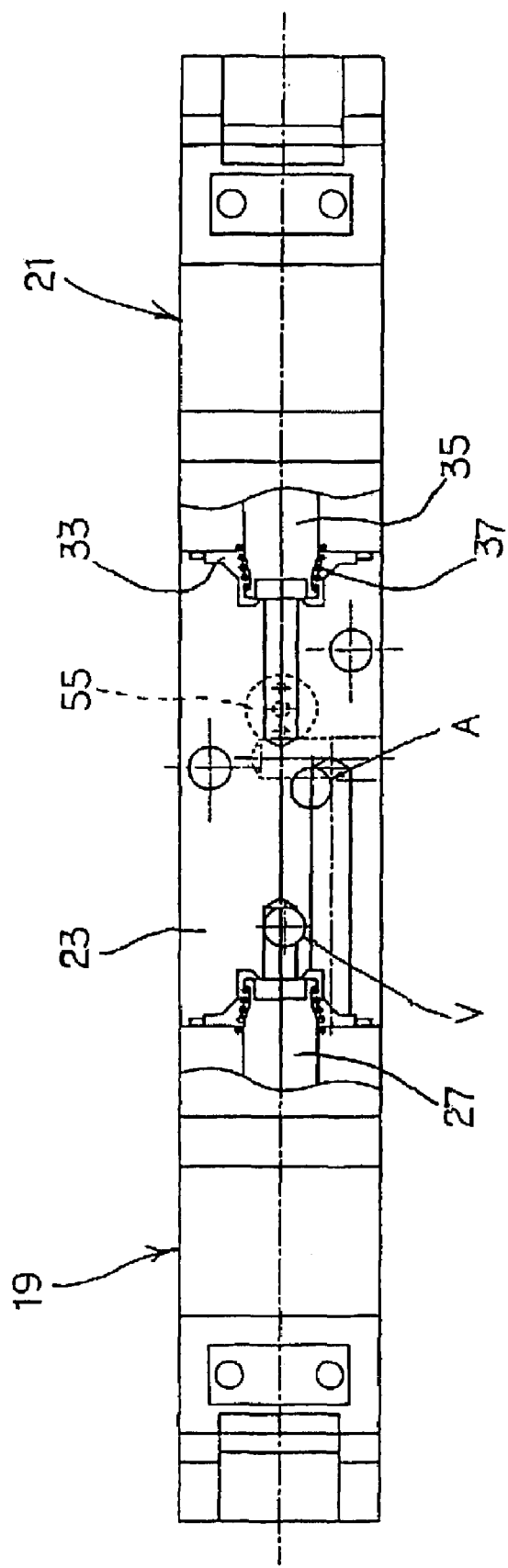
FIG. 21 is a sectional view showing the fourth embodiment of the switching valve device of the present invention.
Figure 22:
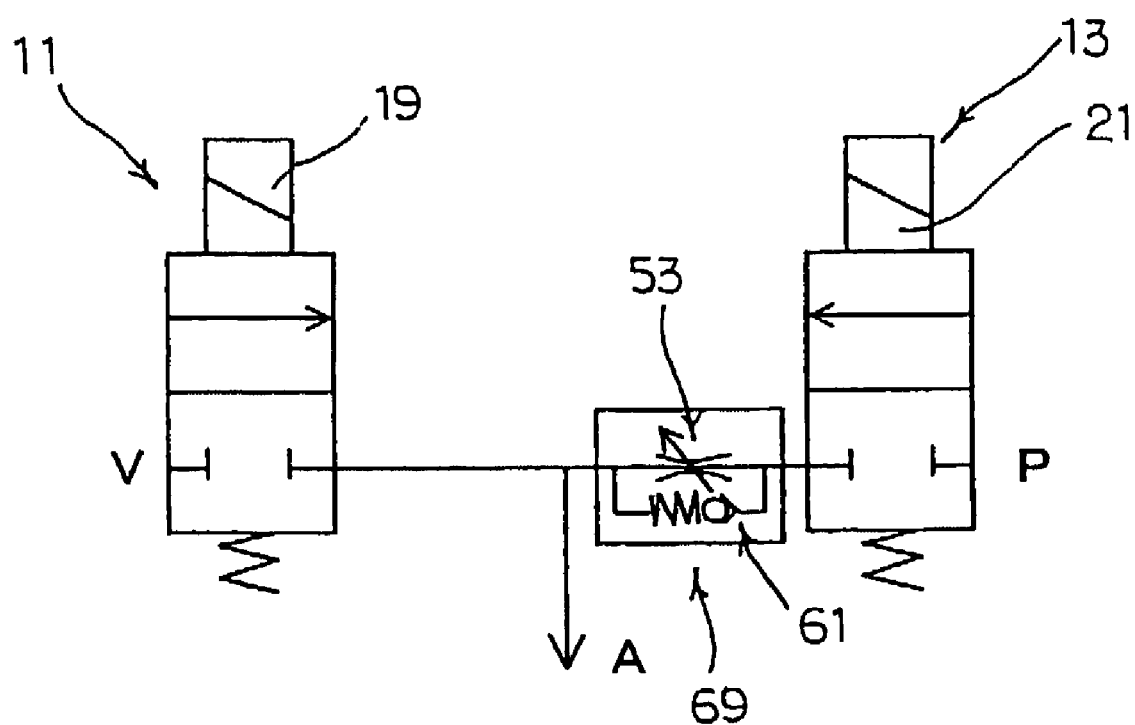
FIG. 22 is an explanatory view showing a functional circuit of the fourth embodiment of the switching valve device of the present invention.

FIG. 20 and FIG. 21 show a fourth embodiment of the switching valve device of the present invention, and FIG. 22 is a functional circuit diagram showing a basic configuration of the switching valve device of the fourth embodiment.

In this embodiment, the same numerals and symbols will be used to designate the same members as those in the first to third embodiments, and a detailed description thereof will be omitted.

In the switching valve device according to the present embodiment, as shown in FIG. 22, a throttle valve function with a relief function 69 is provided on the output port A side of the vacuum break switching valve function 13.

The throttle valve function with the relief function 69 is configured similarly to the throttle valve function 53 to which the relief valve function 61 is added in the third embodiment.

In this embodiment, the open-to-atmosphere switching valve function 17 is omitted from the third embodiment.

In the switching valve device according to the present embodiment, when the vacuum break solenoid 21 is turned on, the plunger 35 of the vacuum break solenoid 21 is attracted to the right side of the figure by electromagnetic force against biasing force of the coil spring 37.

As a result, the gap is formed between the forward end surface of the plunger 35 and the valve seat 33a of the pressurization-side valve chamber 33, so that the pressurization-side valve chamber 33 communicates with the throttle valve chamber 55 via the passage 23i.

As shown in FIG. 18, pressurized air from the passage 23i pushes up the relief seat 65 against biasing force of the coil spring 63, and the pressurized air is supplied to the output port A through the gap between the bottom surface of the relief seat 65 and the bottom surface of the throttle valve chamber 55 and the gap between the throttle valve 57 and the through hole 65a of the relief seat 65 and via the passage 23j.

As a result of this supply, the pressure in the output port A abruptly approaches the atmospheric pressure, and the differential pressure with respect to the pressure in the throttle valve chamber 55 decreases. The relief seat 65 cuts off the passage 55b by biasing force of the coil spring 63 as shown in FIG. 16, and only the pressurized air which has passed through the gap between the throttle valve 57 and the through hole 65a of the relief seat 65 and been throttled by the throttle valve 57 is supplied to the output port A.

Figure 23:
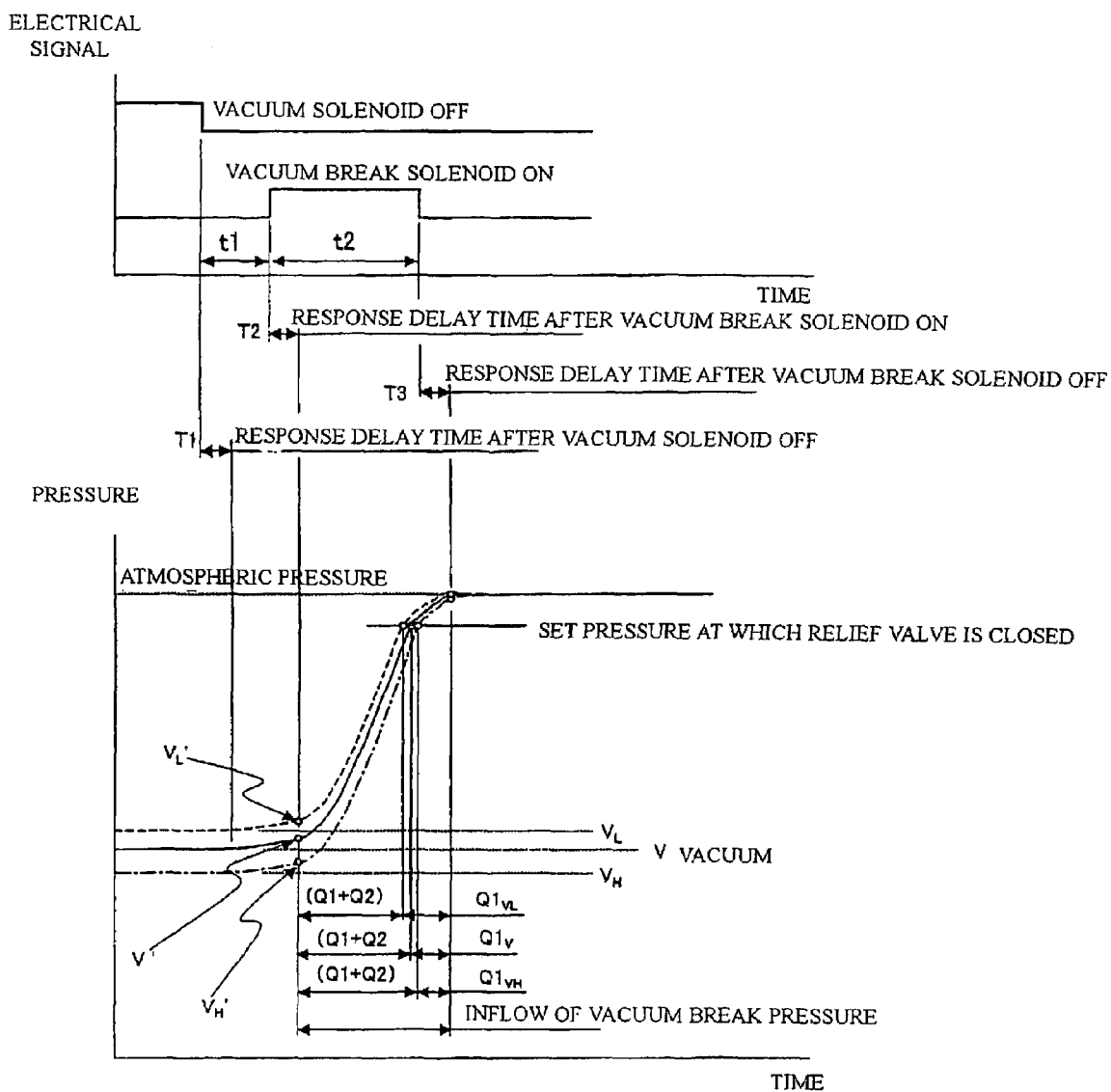
FIG. 23 is an explanatory view showing a pressure change characteristic of the fourth embodiment of the switching valve device of the present invention.

FIG. 23 shows a pressure change characteristic of the switching valve device according to the present embodiment.

In this embodiment, the vacuum solenoid 19 is turned off by the response delay time T1 from the turning-off of the electrical signal to the vacuum solenoid 19, and the supply of vacuum pressure ceases. As a result, the held vacuum pressure starts to decrease gradually.

Further, the electrical signal to the vacuum break solenoid 21 is turned on the time t1 after the electrical signal to the vacuum solenoid 19 is turned off. The vacuum break solenoid 21 is turned on by the response delay time T2 from the turning-on of the electrical signal thereto, thereby supplying positive pressure as vacuum break pressure. As a result, the pressure in the output port A abruptly increases.

The electrical signal to the vacuum break solenoid 21 is in an on state for a time t2 until the pressure in the output port A approaches the pressure of the atmosphere and thereafter turned off. The vacuum break solenoid 21 is brought into an off state a response delay time T3 after the electrical signal to the vacuum break solenoid 21 is turned off, so that the supply of vacuum break pressure ceases and the pressure in the output port A converges to the atmospheric pressure. This process is the same as the case where the throttle valve function with the relief function 69 is not provided.

However, in the case of the throttle valve function with the relief function 69, the supply of the vacuum break pressure causes the relief seat 65 to operate. The flow of the vacuum break pressure flowing into the output port A is a sum of the flow Q2 passing through the opening portion of the relief seat 65 and the flow Q1 passing through the throttle valve 57. The relief seat 65, set to close at a certain pressure, closes when the pressure reaches the certain pressure, and thereafter the vacuum break pressure is only the flow Q1 passing through the throttle valve 57. Q1 is adjusted appropriately, so that the pressure increase due to Q1 is gradual.

Accordingly, it is possible to solve the problems such as the throw-out of the workpiece and the non-release of the workpiece which occur in the general usage of the device described above, as well as the problem as the prolongation of the tact time which occurs in the device with only a throttle provided.

In the switching valve device according to the present embodiment, at the time of vacuum break, first, pressurized air which has passed through the throttle valve function 53 and the relief valve function 61 is supplied to the output port A, and then, only pressurized air which has passed through the throttle valve function 53 is supplied to the output port A, whereby overshoot can be reduced certainly.

Further, the vacuum suction switching valve function 11, the vacuum break switching valve function 13, and the throttle valve function with the relief function 69 are integrally incorporated, which makes it possible to make the switching valve device compact and downsized and provide the switching valve device at a low price.

Fifth Embodiment

Figure 24:
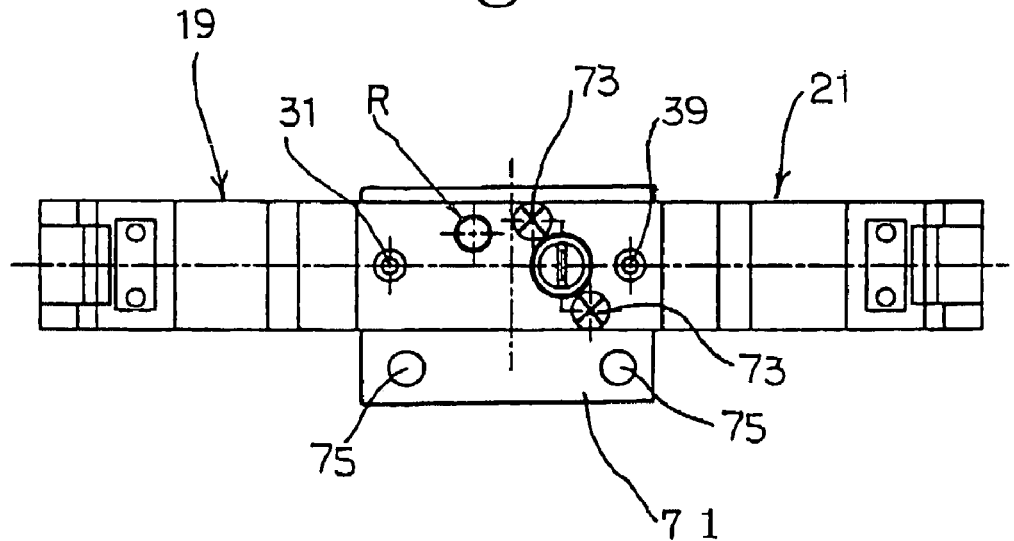
FIG. 24 is a top view showing a state where the third embodiment of the switching valve device of the present invention is mounted on a sub-base.
Figure 25:
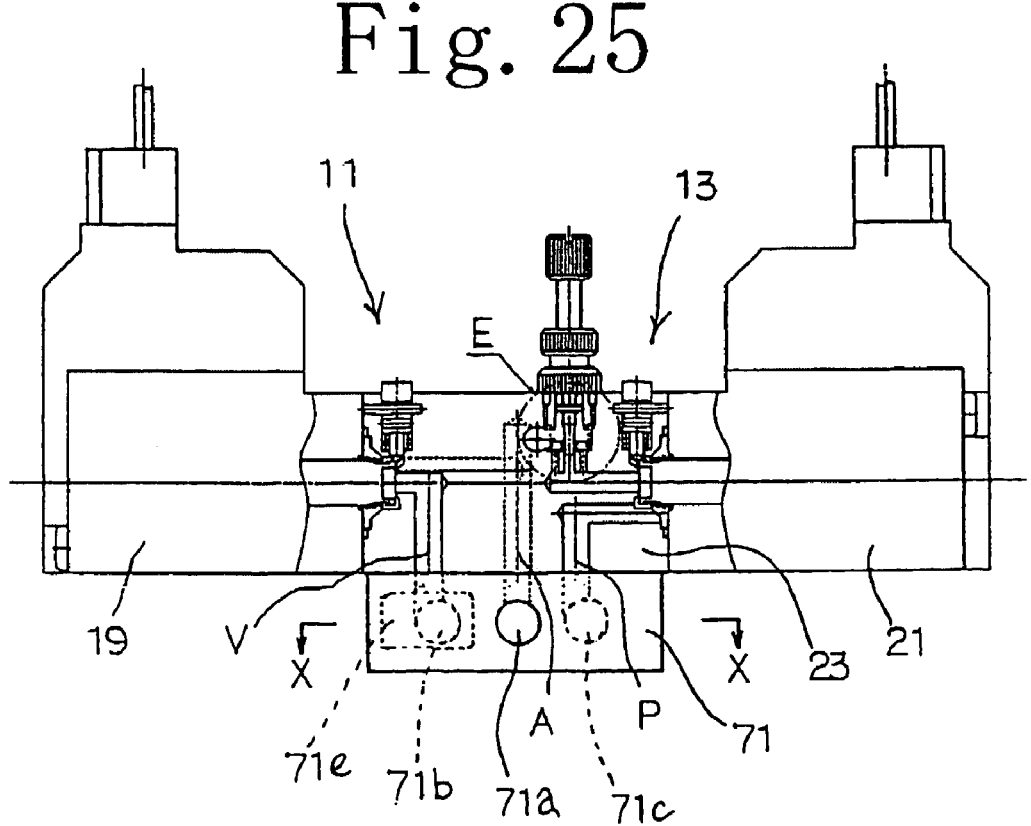
FIG. 25 is a side view showing the state where the third embodiment of the switching valve device of the present invention is mounted on the sub-base.

FIG. 24 and FIG. 25 show a fifth embodiment of the switching valve device of the present invention.

In this embodiment, a sub-base 71 is attached to the valve body 23 of the switching valve device of the third embodiment.

Incidentally, in this embodiment, the same numerals and symbols will be used to designate the same members as those in the first to third embodiments, and a detailed description thereof will be omitted.

In the switching valve device according to the present embodiment, as shown in FIG. 24 and FIG. 25, the rectangular parallelepiped-shaped sub-base 71 is attached to a lower surface of the valve body 23.

As shown in FIG. 24, this sub-base 71 is coupled to the valve body 23 by screws 73 which are inserted into the mounting holes 23a and 23b of the valve body 23.

Mounting holes 75 composed of through holes are formed in an upper surface of the sub-base 71.

Figure 26:
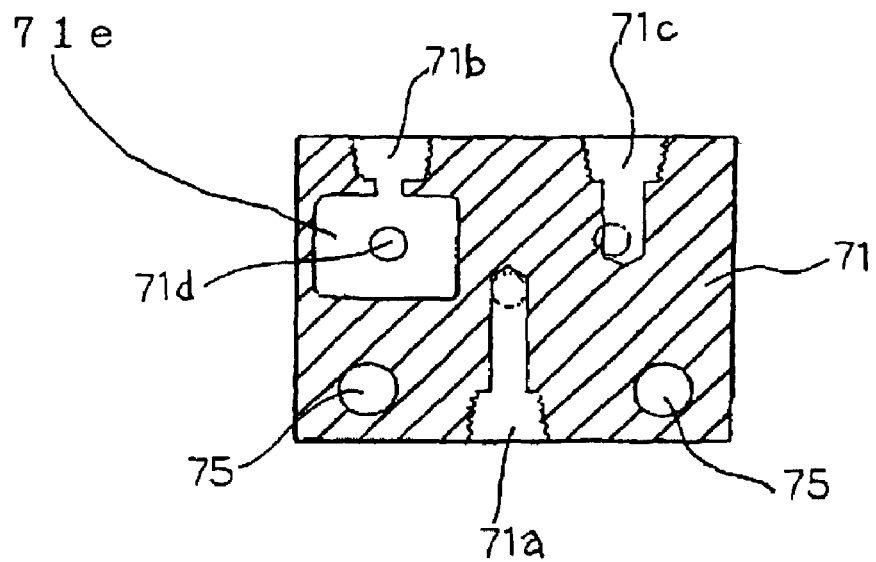
FIG. 26 is a sectional view along the line X-X of the sub-base in FIG. 25.

FIG. 26 is a sectional view of the sub-base 71 along the line X-X in FIG. 25, and on one side of the sub-base 71, an output port portion 71a which communicates with the output port A of the valve body 23 is formed.

On the other side of the sub-base 71, a vacuum port portion 71b which communicates with the vacuum port V of the valve body 23 and a pressurization port portion 71c which communicates with the pressurization port P are formed.

Formed in a passage 71d which connects the vacuum port portion 71b of the sub-base 71 and the vacuum port V of the valve body 23 is a tank portion 71e having a void larger than the passage 71d.

In this embodiment, the tank portion 71e is formed in a rectangular parallelepiped shape.

In the switching valve device according to the present embodiment, the tank portion 71e which communicates with the vacuum port V of the vacuum suction switching valve function 11 is formed in the sub-base 71, which can effectively prevent a drop in the degree of vacuum.

Namely, for example, even if the degree of vacuum drops at the time of vacuum suction, thanks to the tank portion 71e, the drop in the degree of vacuum can be suppressed, and vacuum holding performance can be maintained.

Sixth Embodiment

Figure 27:
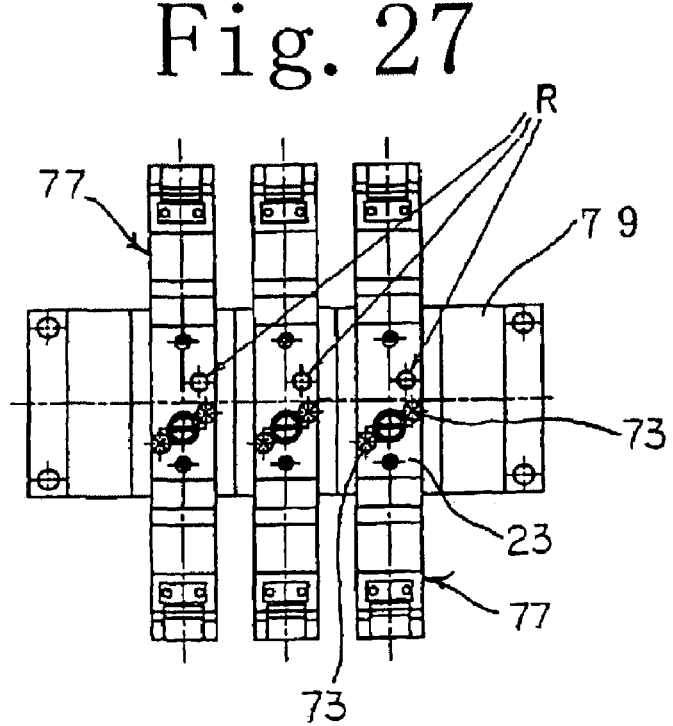
FIG. 27 is a top view showing a state where the third embodiment of the switching valve device of the present invention is mounted on a manifold base.
Figure 28:
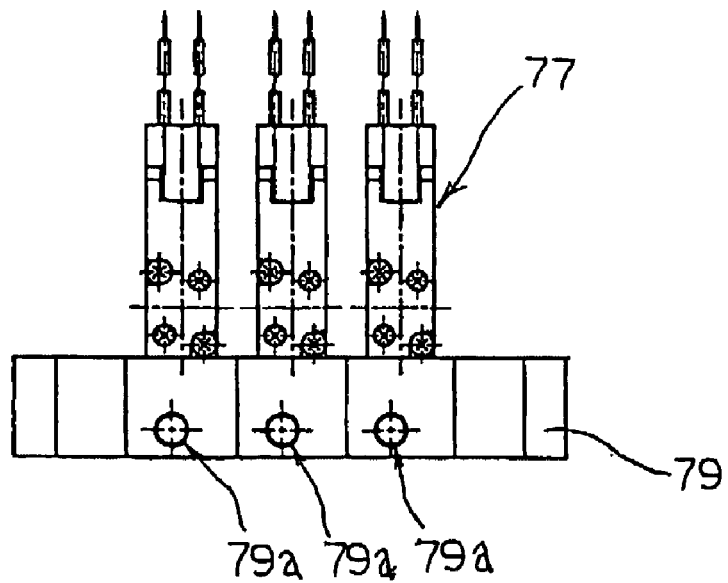
FIG. 28 is a side view of FIG. 27.
Figure 29:
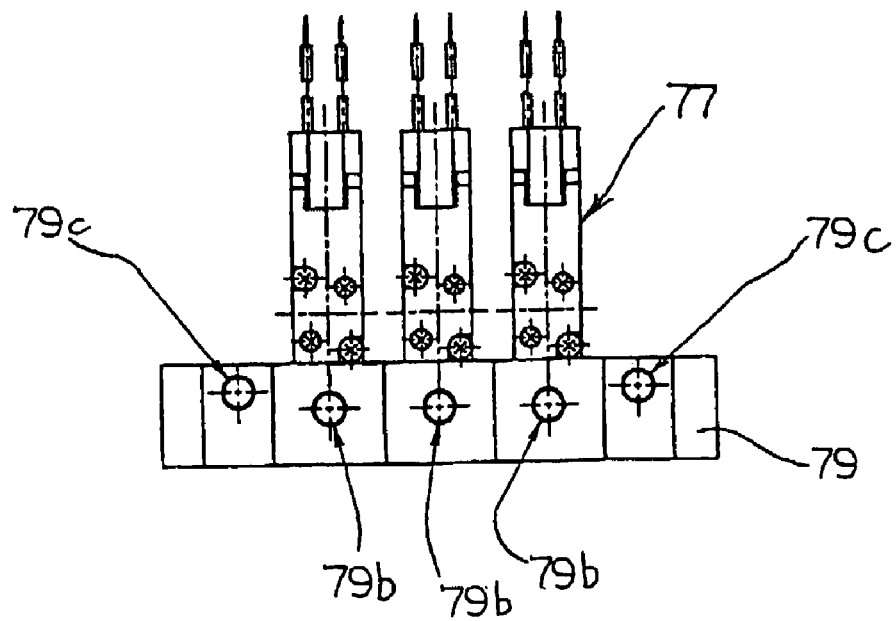
FIG. 29 is a side view of FIG. 27.

FIG. 27 to FIG. 29 show a sixth embodiment of the switching valve device of the present invention.

In this embodiment, plural switching valve devices 77 of the third embodiment are attached to a manifold base 79.

Incidentally, in this embodiment, the same numerals and symbols will be used to designate the same members as those in the first to third embodiments, and a detailed description thereof will be omitted.

In the switching valve device according to the present embodiment, as shown in FIG. 27, the plural switching valve devices 77 are attached to an upper surface of the manifold base 79 in parallel at predetermined intervals.

The switching valve devices 77 are each coupled to the manifold base 79 by the screws 73 which are inserted into the mounting holes 23a and 23b of the valve body 23.

Figure 30:
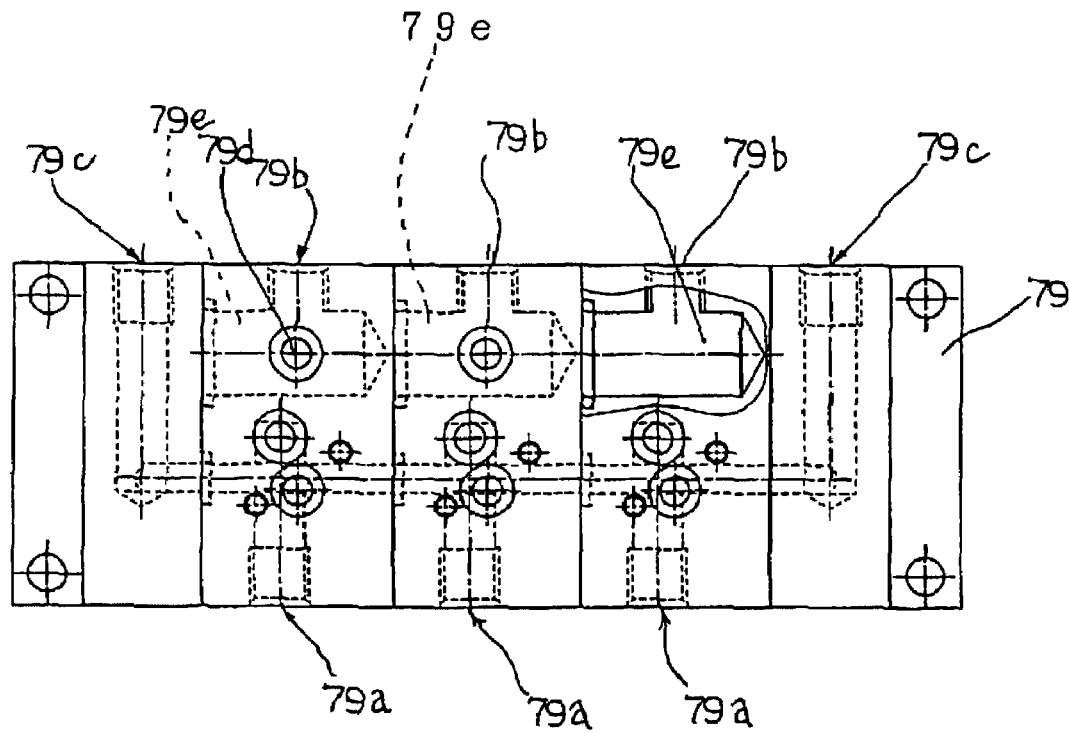
FIG. 30 is a top view showing the manifold base in FIG. 27.
Figure 31:
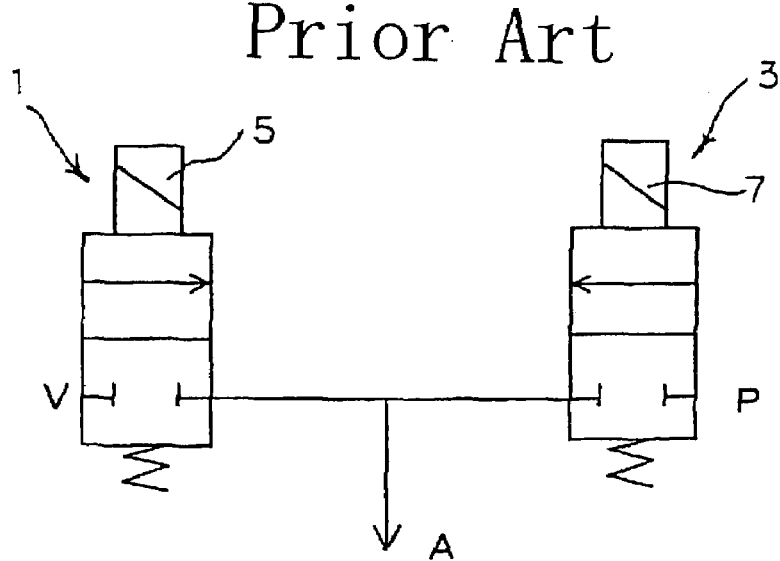
FIG. 31 is an explanatory view showing a conventional switching valve device.
Figure 32:
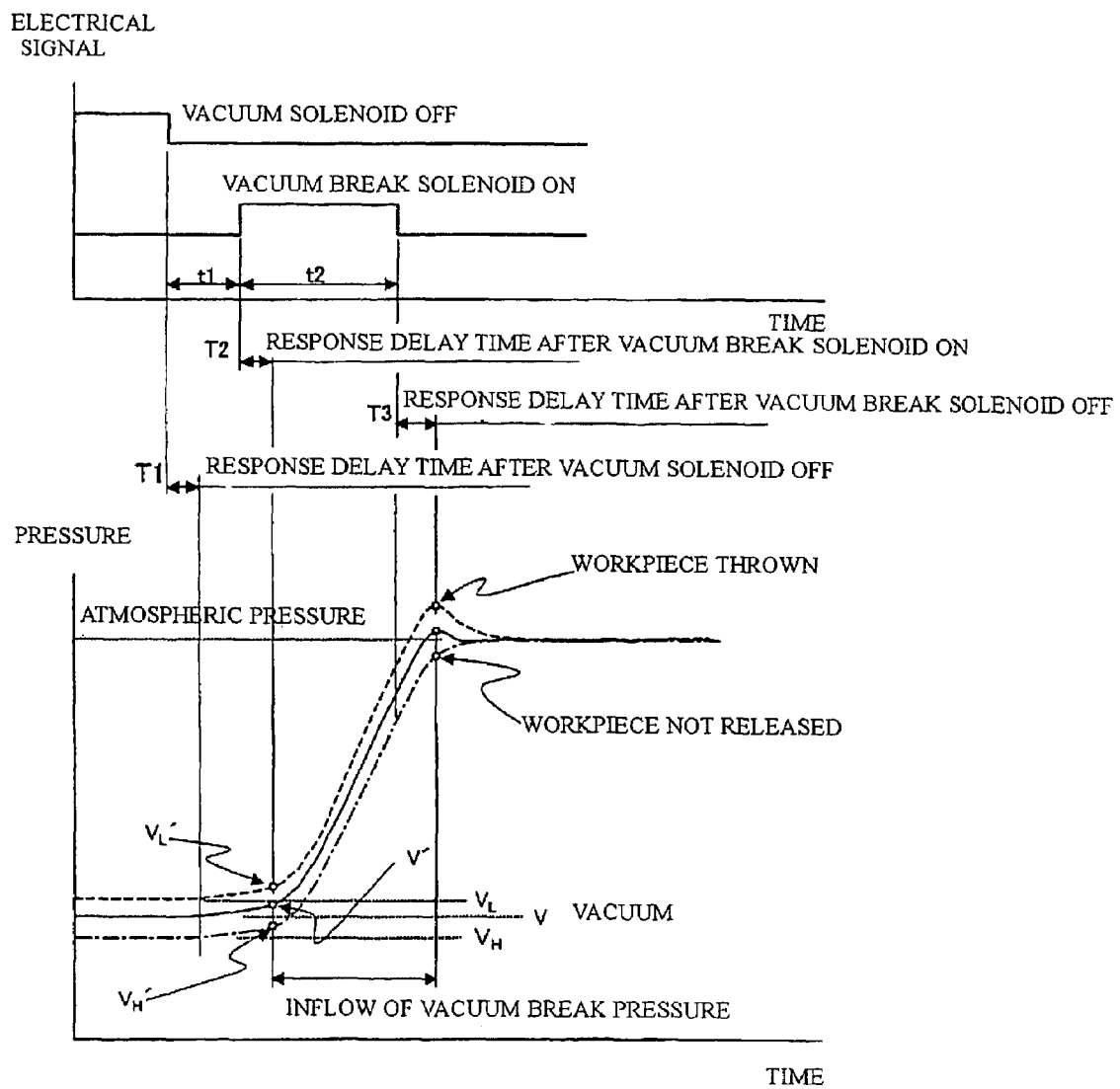
FIG. 32 is an explanatory view showing a pressure change characteristic of the switching valve device in FIG. 31.
Figure 33:
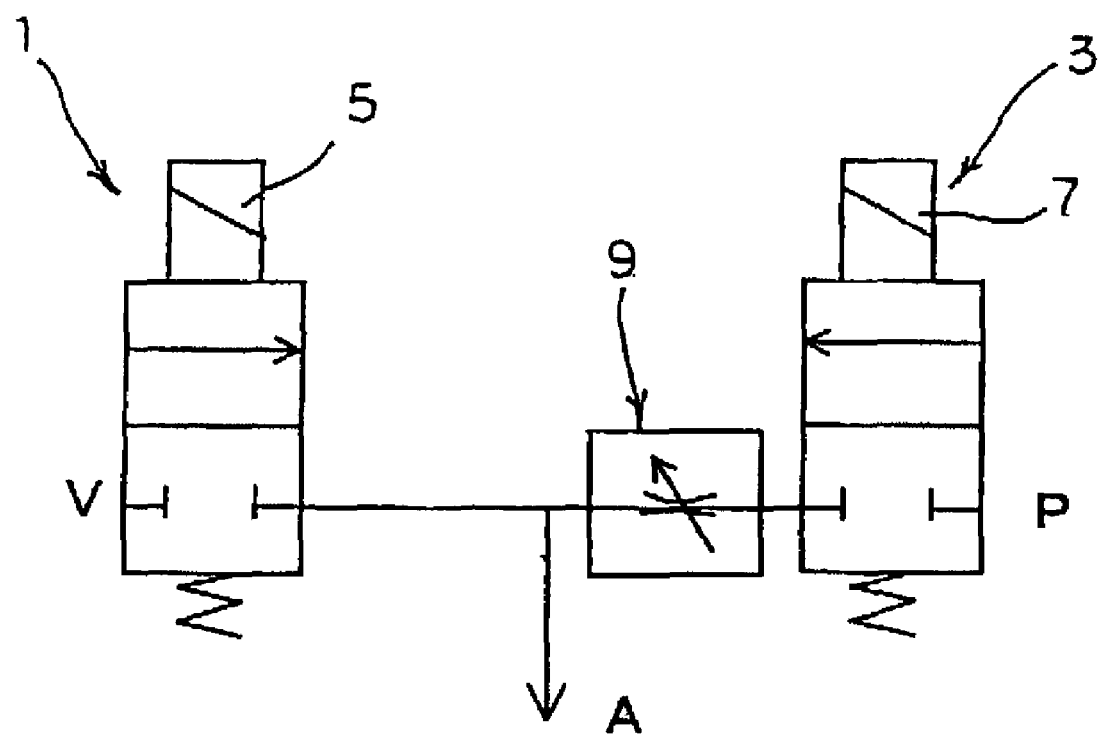
FIG. 33 is an explanatory view showing another example of the conventional switching valve device.
Figure 34:
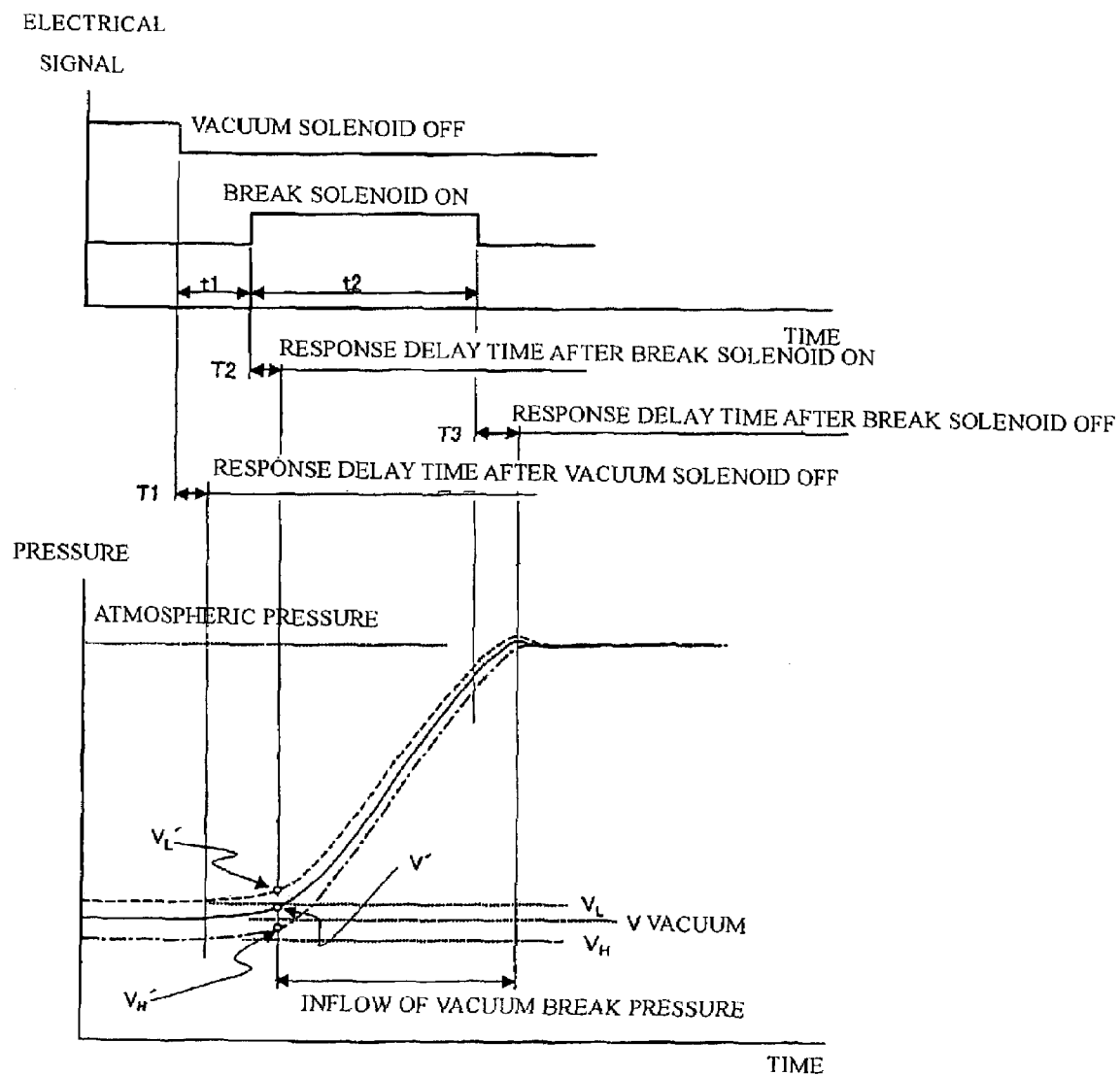
FIG. 34 is an explanatory view showing a pressure change characteristic of the switching valve device in FIG. 33.

FIG. 30 is a top view showing the manifold base 79, and on one side of the manifold base 79, output port portions 79a which communicate with the output ports A of the valve bodies 23 are formed at predetermined intervals.

On the other side of the manifold base 79, vacuum port portions 79b which communicate with the vacuum ports V of the valve bodies 23 are formed at predetermined intervals.

Further, at both ends of the other side of the manifold base 79, pressurization port portions 79c which communicate with the pressurization ports V of the valve bodies 23 are formed.

Formed in passages 79d which connect the vacuum port portions 79b of the manifold base 79 and the vacuum ports V of the valve bodies 23 are tank portions 79e each having a void larger than the passage 79d.

In this embodiment, the tank portion 79e is formed in a cylindrical shape.

In the switching valve device according to the present embodiment, the tank portion 71e which communicates with the vacuum port V of the vacuum suction switching valve function 11 is formed in the manifold base 79, which can effectively prevent a drop in the degree of vacuum.

Namely, for example, even if the degree of vacuum drops at the time of vacuum suction, thanks to the tank portion 79e, the drop in the degree of vacuum can be suppressed and vacuum holding performance can be maintained.

The above-described embodiments describes the example in which the vacuum suction switching valve function 11 and the open-to atmosphere switching valve function 17 are operated mechanically in conjunction with each other, but the present invention is not limited to such embodiments. For example, the vacuum suction switching valve function 11 and the open-to-atmosphere switching valve function 17 may be operated electrically in conjunction with each other.

Further, according to the above-described embodiments, the inflow of dust from the atmosphere side can be certainly inhibited by providing a filter unit in a passage open to the atmosphere of the open-to-atmosphere switching valve function 17.

The invention is not limited to the above embodiments and various modifications may be made without departing from the spirit and scope of the invention. Any improvement may be made in part or all of the components.

What is claimed is:

1. A vacuum switching valve device, comprising:
    a vacuum suction switching valve (11) for vacuum suction;
    a vacuum break switching valve (13) for vacuum break;
    an open-to-atmosphere switching valve (17) which operates in conjunction with an operation of said vacuum suction switching valve (11);
    a valve body (23) being formed by having said vacuum suction switching valve (11), said vacuum break switching valve (13) and said open-to-atmosphere switching valve (17) in a single unit, the valve body (23) being rectangular parallelepiped in shape;
    wherein said valve body (23) comprises on its bottom face a vacuum port (V) being connected to a vacuum source through an internal passage (23c) of said valve body (23), a pressurization port (P) being connected to a pressure source through an internal passage (23e) of said valve body (23), and an output port (A) being connected to a vacuum suction unit through a second internal passage (23f) of said valve body )(23);
    said vacuum suction switching valve (11) is attached to the one side surface of said valve body (23) and comprises a 2-port electromagnetic switching valve adapted to open and shut said pressurization port (P) and said output port (A) opening to the one side surface of said valve body (23);
    said vacuum break switching valve (13) is attached to the other side surface of said valve body (23) and comprises a 2-port electromagnetic switching valve adapted to open and shut said vacuum port (V) and said output port (A) opening to the one side surface of said valve body (23); and
    said open-to-atmosphere switching valve (17) comprising:
        a vacuum-side valve chamber (25) placed on a plunger side (27) of said solenoid (19) configurating said vacuum suction switching valve (11);
        an atmosphere-side valve chamber (41) formed by an opening to said vacuum-side valve chamber (25) in parallel to an axis of the plunger side (27);
        an open-to-atmosphere port (R) opening at a front edge (41b) of said atmosphere-side valve chamber (41) through a passage (23h);
        a cylindrical valve seat member (43) fixed on said atmosphere-side valve chamber (41);
        an open-to-atmosphere plunger (45) having a rear end surface (45a) adjacent to a forward end surface (27a) of the plunger side (27) forming recessed portions (45b) on an outer periphery adapted to form gaps (47) between the outer periphery and said valve seat member (43) and being movably inserted into said cylindrical valve seat member (43);
        a spherical valve (49) setup on the open-to-atmosphere port portion (R) of said open-to-atmosphere plunger (45);
        a first valve seat (43a) adapted to seal the a spherical valve (49) and formed on a forward end of said cylindrical valve seat member (43);
        a second valve seat (41a) adapted to seal said spherical valve (49) and formed on the open-to-atmosphere port (R) opening of said atmosphere-side valve chamber (41);
        a third valve seat (25a) adjacent to said forward end surface of the plunger side (27) and formed on said vacuum side valve chamber (25) side of the passage which connects said vacuum-side valve chamber (25) and said vacuum port (V);
        the open-to-atmosphere switching valve (17) of said vacuum switching valve device connects said vacuum port (V) to said open-to-atmosphere port (R) in synchronization with the plunger (27) and shuts down said open-to-atmosphere port (R) by shutting down said open-to-atmosphere port (R) by air pressure which inflows from said vacuum break switching valve (13).

2. The vacuum switching valve device according to claim 1, further comprising:
    a throttle valve (53);
    the throttle valve (53) being placed in a midstream of a gateway passage (23i) which continues from said output port (A) of said valve body (23) to said vacuum break switching valve (13), and places an operating portion (59) adapted to adjust a throttle amount of said throttle valve (53) placed outwards of said valve body (23).

3. The vacuum switching valve device according to claim 2, wherein
said throttle valve (53) is built-in a throttle valve chamber (55) of said valve body (23) and places a relief valve (61) with said throttle valve (53), in a concentric pattern, in said throttle valve chamber (55).

4. The vacuum switching valve device according to claim 1, wherein:
either one of a sub-base and a manifold base is fitted on the bottom surface of said valve body (23) and said vacuum port (V) to said vacuum source, said pressurization port (P) to a pressure source, and said output port (A) to a vacuum suction part.

5. The switching valve device according to claim 4, further comprising:
a space (71e, 79e) for a tank formed on either one of said sub-base and manifold base at the internal passage which connects said vacuum port (V) and said vacuum source.

* * * * *